US012655663B2

(12) United States Patent
Zarbeck et al.

(10) Patent No.: US 12,655,663 B2
(45) Date of Patent: Jun. 16, 2026

(54) ROLLING SHUTTER LOCKING SYSTEM

(71) Applicant: Qualitas Manufacturing Incorporated, Itasca, IL (US)

(72) Inventors: Craig N. Zarbeck, Stevensville, MI (US); Orlando Amil, Chicago, IL (US); James V. Miller, Glen Ellyn, IL (US)

(73) Assignee: Qualitas Manufacturing Incorporated, Itasca, IL (US)

( * ) Notice: Subject to any disclaimer, the term of this patent is extended or adjusted under 35 U.S.C. 154(b) by 237 days.

(21) Appl. No.: 17/839,251

(22) Filed: Jun. 13, 2022

(65) Prior Publication Data

US 2022/0396984 A1 Dec. 15, 2022

Related U.S. Application Data

(60) Provisional application No. 63/233,715, filed on Aug. 16, 2021, provisional application No. 63/210,461, filed on Jun. 14, 2021.

(51) Int. Cl.
*E05C 9/04* (2006.01)
*E06B 9/15* (2006.01)
(Continued)

(52) U.S. Cl.
CPC .................. *E05C 9/04* (2013.01); *E06B 9/15* (2013.01); *E06B 9/17046* (2013.01); *E06B 9/58* (2013.01);
(Continued)

(58) Field of Classification Search
CPC .......... E06B 9/15; E06B 9/17046; E06B 9/58; E06B 2009/1544; E06B 2009/1583;
(Continued)

(56) References Cited

U.S. PATENT DOCUMENTS 1,873,485 A * 8/1932 Rowe .................. E05B 65/0021 16/104
1,955,439 A * 4/1934 Robinson ............ E05B 65/0021 70/129
(Continued)

FOREIGN PATENT DOCUMENTS

DE 19648177 A1 5/1997
EP 3450674 A1 3/2019
EP 3450674 B1 4/2021

OTHER PUBLICATIONS

Alulux, "Qompact roller shutters", catalog (Mar. 2020).
(Continued)

*Primary Examiner* — Johnnie A. Shablack
*Assistant Examiner* — Matthew R. Shepherd
(74) *Attorney, Agent, or Firm* — Ice Miller LLP

(57) ABSTRACT

A locking system for a rolling shutter having a plurality of shutter slats and a guide track with a U-shaped guide channel having a channel base, comprises a lock bar coupled to the shutter slats with a locked position extending transverse to the channel base. A lock bar notch covered by a breakaway wall is aligned with the channel base in the locked position. The lock bar may be slidably received in a sleeve that is positioned in the guide channel to increase resistance to torsional forces. Alternatively, the locking system comprises a unitary extruded body with a longitudinal channel, and a lock bar, and handle received in the channel. The lock bar is slidable in the channel between an extended locked position and a retracted unlocked position, with the handle positioned in the channel to stop the retraction of the lock bar at the unlocked position.

6 Claims, 22 Drawing Sheets

(51) Int. Cl.
*E06B 9/17* (2006.01)
*E06B 9/58* (2006.01)

(52) U.S. Cl.
CPC ................. *E06B 2009/1544* (2013.01); *E06B 2009/1583* (2013.01)

(58) Field of Classification Search
CPC ... E06B 9/13; E05C 9/04; E05C 9/042; E05B 65/0021
See application file for complete search history.

(56) References Cited

U.S. PATENT DOCUMENTS

| | | | | |
|---|---|---|---|---|
| 2,836,238 | A * | 5/1958 | Baldwin | A01G 9/222 160/229.1 |
| 3,078,917 | A | 2/1963 | Recchione | |
| 4,807,687 | A | 2/1989 | Finch et al. | |
| 5,040,269 | A * | 8/1991 | Lyons, Jr. | E05D 5/0215 403/402 |
| 6,065,525 | A * | 5/2000 | Wells | E06B 9/58 160/273.1 |
| 7,028,738 | B2 | 4/2006 | Ceccofiglio | |
| 7,464,743 | B1 | 12/2008 | Berger | |
| 8,616,261 | B2 | 12/2013 | Miller | |
| 8,925,617 | B2 | 1/2015 | Miller | |
| 8,944,137 | B2 | 2/2015 | Miller | |
| 9,074,411 | B2 | 7/2015 | Miller et al. | |
| 10,246,904 | B1 * | 4/2019 | White | E05B 47/0001 |
| 2002/0178771 | A1 * | 12/2002 | Porter | E05C 9/046 70/257 |
| 2004/0244296 | A1 * | 12/2004 | Dinkelborg | E05C 9/041 49/449 |
| 2019/0284874 | A1 * | 9/2019 | Healam | E06B 9/17046 |
| 2019/0390516 | A1 * | 12/2019 | Miller | E06B 9/15 |
| 2019/0390517 | A1 * | 12/2019 | Miller | E06B 9/86 |
| 2020/0199922 | A1 * | 6/2020 | Cote | E05C 9/1875 |
| 2020/0270918 | A1 * | 8/2020 | Bogdanov | E05B 47/0673 |

OTHER PUBLICATIONS

Int'l Appl'n No. PCT/US22/33316, Search Report, Written Opinion, Sep. 8, 2022.
European Patent Application No. 22825618.6, Search Report (May 26, 2025).

* cited by examiner

ROLLING SHUTTER LOCKING SYSTEM

This application claims the benefit of U.S. Provisional Application No. 63/210,461, filed on Jun. 14, 2021, and U.S. Provisional Application No. 63/233,715, filed on Aug. 16, 2021, which are hereby incorporated by reference in their entirety.

BACKGROUND OF THE INVENTION

The present invention relates to rolling shutter systems and, in particular, to the configurations of the slats for a rolling shutter system.

Rolling shutter systems comprise a series of slats that are linked together to form an articulated curtain that covers an opening of a structure, such as a doorway or window. The slats typically span the width of the opening, and have an upper edge with a hook-shaped engaging track, and a lower edge with a receiving track that forms a pocket for receiving the engaging track of another slat. The slats are linked by the slidable engagement of the engaging track of a first slat in the receiving track of a second slat, to form a loosely articulated hinge between the slats. In an open position, the rolling shutter curtain is retracted or raised away from the opening by coiling or winding the slats about a spindle positioned at the top of the opening. In the closed position, the slats are unwound from the spindle and extended or lowered toward the bottom of the opening. An example of a shutter slat is described in U.S. Pat. No. 9,074,411 to Miller et al., which is incorporated herein by reference.

The rolling shutter may also include a base slat located at the end of the series of slats, to be positioned at the bottom of the opening in the closed position. The base slat commonly includes a locking device to secure the rolling shutter in the closed position. Attempts to force open the rolling shutter often include prying the base slat upward to raise the rolling shutter. The prying forces can cause the base slat to be deflected or bent, and can pull the locking device out of the locked position. Prying the base slat can also exert twisting forces that may cause the locking device to fail. Thus, it would be desirable to provide a base slat locking device that resists prying.

Conventional rolling shutter slats are commonly designed to have engaging tracks and receiving tracks that fit closely to prevent intrusion into the hinge and to resist deflection of the extended rolling shutter curtain from external forces. However, the closely fitting design tends to accumulate debris, which becomes compacted over time and may interfere with the operation of the hinge. The narrow dimensional tolerances of the closely fitting design also increases the difficulty in manufacturing the rolling shutter slats.

To better accommodate the introduction of debris, it would be desirable to design the rolling shutter slats with loosely articulated hinges that have an increased clearance and range of rotation. A loosely articulated hinge design would also increase the allowable dimensional tolerances and improve the manufacturability of the slats. However, such designs also increase the risk of inadvertent decoupling of the slats in the rolling shutter. Thus, it would be desirable to provide a loosely articulated hinge design without the problem of decoupling.

Rolling shutters are also commonly designed to reduce the profile of the retracted rolling shutter, by configuring the slats to be tightly nested when coiled about the spindle. The tight nesting of the slats increases the contact between slats and the risk of wear and cosmetic blemishes to the finish of the slats. Thus, it would be desirable to protect against inadvertent contact and wear between the slats, while maintaining the ability to tightly coil the rolling shutter in the retracted position.

SUMMARY OF THE INVENTION

In one embodiment, a locking system for a rolling shutter that includes a plurality of rolling shutter slats, comprises a guide track comprising a U-shaped guide channel having a channel base, and first and second channel walls. The guide channel is sized and shaped to receive the ends of the rolling shutter slats and guide the movement of the rolling shutter slat ends longitudinally within the guide channel. A lock bar is coupled to the linked slats and slidable transversely within the guide channel between locked and unlocked positions. The lock bar in the locked position extends transverse to the channel base. In a further embodiment, the lock bar further comprises a lock bar edge with a breakaway wall extending over a notch in the lock bar edge. The breakaway wall is aligned with the channel base when the lock bar is in the locked position.

In another embodiment, the locking system further comprises a sleeve having a sleeve end with a sleeve opening. The sleeve end is positioned in the guide channel, and the lock bar is slidably received in the sleeve opening. The lock bar has opposite first and second lock bar ends, the second lock bar end positioned in the sleeve and the first lock bar end extending from the sleeve opening transverse to the channel base in the locked position. In further embodiment, the locking system also comprises a stop bar. The sleeve end has a second opening, and the stop bar is slidingly received in the second opening.

In one embodiment, a locking system for a rolling shutter comprises a unitary extruded body, a lock bar, and a handle. The unitary extruded body has a body end, and a longitudinal first channel with a first opening at the body end. The lock bar has opposite first and second lock bar ends. The lock bar is positioned in the first channel and slidable longitudinally in the body between a locked position with the second end positioned within the channel and the first end extending from the first opening, and an unlocked position with the first and second lock bar ends positioned in the first channel. The handle has opposite first and second handle ends. The first handle end comprises a grip projecting transversely from the body, and the second handle end comprises a stop flange that is removably received in the first channel. The stop flange is a stop for the movement of the lock bar in the first channel.

In another embodiment, a locking system for a rolling shutter comprises a plurality of rolling shutter slats. The locking system comprises a base slat, a guide track, a lock bar, a lock, and a fastener. The base slat is coupled to the rolling shutter slats, and has a first opening. The guide track comprises a U-shaped guide channel having a channel base, and first and second channel walls. The guide channel is sized and shaped to receive the ends of the rolling shutter slats and guide the movement of the rolling shutter slat ends longitudinally within the guide channel. The lock bar is coupled to the linked slats and slidable transversely within the guide channel between locked and unlocked positions. The lock bar in the locked position extends transverse to the channel base. The lock is moveable between extended and retracted positions. The fastener releasably secures the lock to the lock bar. Wherein the lock and lock bar are positioned in the base slat, the lock bar is accessible through the first opening to adjust the position of the lock bar in the base slat, and the lock bar in the locked position is secured to the lock in the extend position. In a further embodiment, the first opening is aligned with a lock bar segment having a plurality of holes, and the position of the lock bar in the base slat adjustable by alternate engagement of the plurality of holes through the first opening. In a alternative embodiment, the base slat further comprises a second opening, and wherein the fastener is accessible through the second opening to secure the lock to the lock bar.

In one embodiment, a rolling shutter system comprises a spindle and a plurality of coupled slats, including an initial slat coupled to the spindle and a base slat distal to the spindle. The plurality of slats have a retracted position and an extended position, where the slats are wound about the spindle in the retracted position. A retaining rail or guide track is configured to receive the slats in an extended position. In a further embodiment, the rolling shutter system further comprises an end retention device comprising: a retaining screw; a bushing positioned on the retaining screw; and a guide track configured to receive the retaining screw. At least one slat has a screw boss sized and shaped to receive the retaining screw, and the at least one slat is coupled to the guide track when the retaining screw is received in the guide track.

DETAILED DESCRIPTION OF THE INVENTION

Figure 1A:
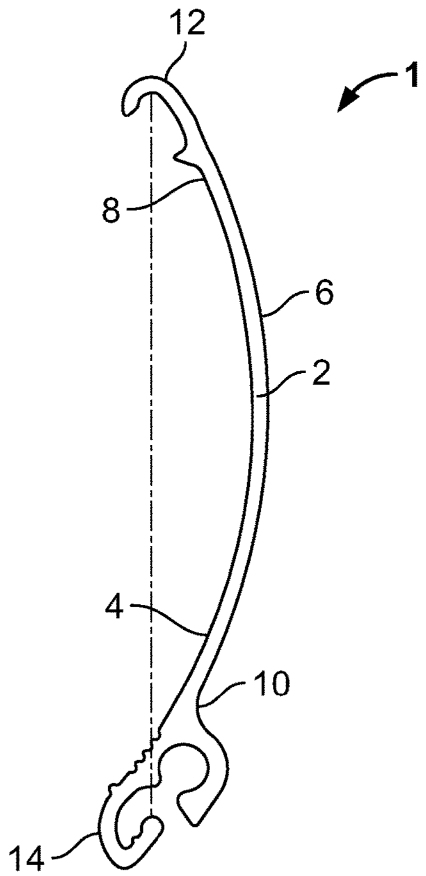
FIG. 1A is a side section view of an embodiment of a rolling shutter slat, in a vertical position.
Figure 1B:
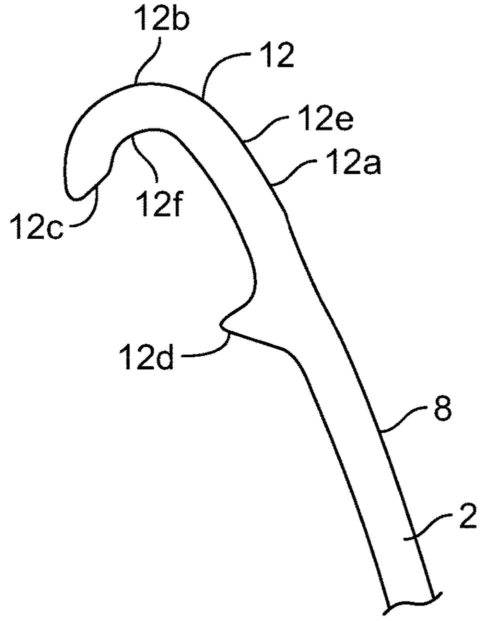
FIG. 1B is a detail, side section view of the engaging track of the slat of FIG. 1A.
Figure 1C:
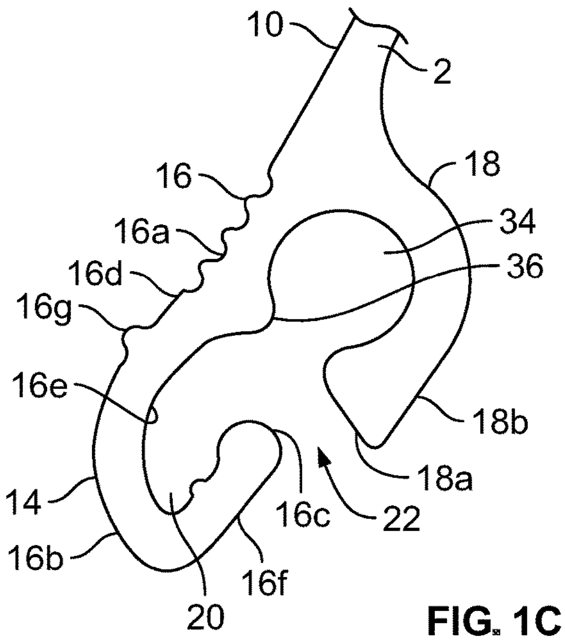
FIG. 1C is a detail, side section view of the receiving track of the slat of FIG. 1A.

Referring to FIGS. 1A-1C, an embodiment of a slat 1 for a rolling shutter is shown. Slat 1 comprises a single-walled body 2 having a curvature with an inner side or surface 4 with a concave curve, and an outer side or surface 6 with a convex curve. Body 2 has a top edge 8 and a bottom edge 10. A hook-shaped engaging track 12 is positioned at edge 8, and a receiving track 14 is positioned at edge 10. Receiving track 14 is configured to receive the engaging track 12 of another slat, such that multiple slats may be linked together in head-to-tail fashion and extended to form a curtain that covers an opening in a structure.

FIG. 1A shows slat 1 in a vertical orientation or position, such as when the rolling shutter is in a closed position and the slats are extended to cover an opening. The centers of mass of engaging track 12 and receiving track 14 are vertically aligned. As shown in FIG. 1B, hook-shaped engaging track 12 is positioned at edge 8, and comprises a neck or base 12*a* adjacent to edge 8, and a bend 12*b* that extends to a tip 12*c*. In one embodiment, base 12*a* extends along the same curvature as body 2, and bend 12*b* curves toward concave inner side 4 such that engaging track 12 does not project beyond the convex curve of outer side 6. In a preferred embodiment, engaging track base 12*a* has an outer surface 12*e* that extends along the same curve as convex outer surface 6 of body 2. In one embodiment, engaging track 12 includes a protrusion or rib 12*d* positioned at edge 8, that projects from concave inner side 4. Engaging track rib 12*d* limits the rotation of engaging track 12 in the receiving track 14 of another slat and prevents inadvertent disengagement of the slats, as described below.

As shown in FIG. 1C, receiving track 14 is positioned at edge 10, and comprises a lip member 16 and guard member 18. Lip member 16 comprises a base 16*a* adjacent to edge 10, and a bend 16*b* that extends to a tip 16*c*. Receiving track bend 16*b* forms a pocket or articulation space 20 that is sized and shaped to receive the hook-shaped engaging track 12 of another slat. In one embodiment, base 16*a* extends along the same curvature as body 2, and bend 16*b* curves toward convex outer side 4 such that receiving track 14 does not project beyond the concave curve of inner side 6. In a preferred embodiment, lip member base 16*a* has an outer surface 16*d* that extends along the same curve as concave inner surface 4 of body 2. In one embodiment, lip member outer surface 16*d* includes a bump or protrusion 16*g* that reduces wear on the slats when the rolling shutter is in the retracted position, as described below.

Guard member 18 is spaced apart from lip member 16, and has a tip 18*a* that extends toward lip member tip 16*c*. Guard member tip 18*a* and lip member tip 16*c* are spaced apart to form an aperture 22, that opens to articulation space 20 and is sized and shaped to receive the hook-shaped engaging track 12 of another slat. Guard member 18 projects above the convex curve of slat outer side 4, and includes an outer surface 18*b* that is approximately concentric with the convex curve of outer side 4.

In one embodiment, receiving track 14 includes a receptacle 34 formed between guard member 16 and lip member 18. Receptacle 34 is separate from articulation space 20, and is sized and shaped to receive an end retention device, as described below. In a preferred embodiment, a rib 36 is formed on the inner surface 16*e* of lip member 16, that separates articulation space 20 and receptacle 34.

Figure 2B:
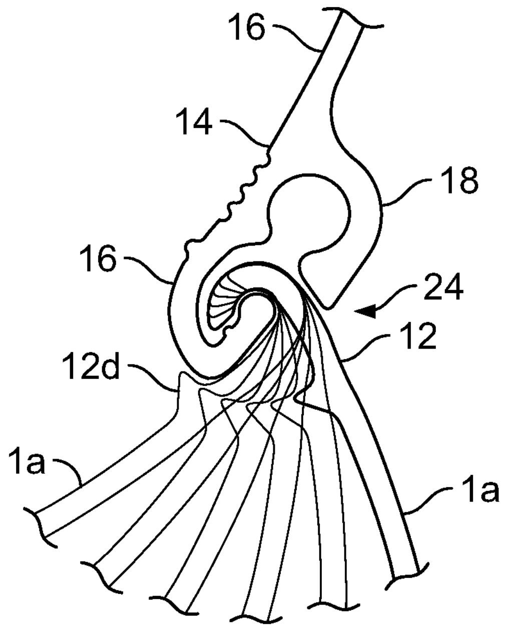
FIG. 2B is a detail, side section view of the hinge between the slats of FIG. 2A, showing the range of rotation.
Figure 2A:
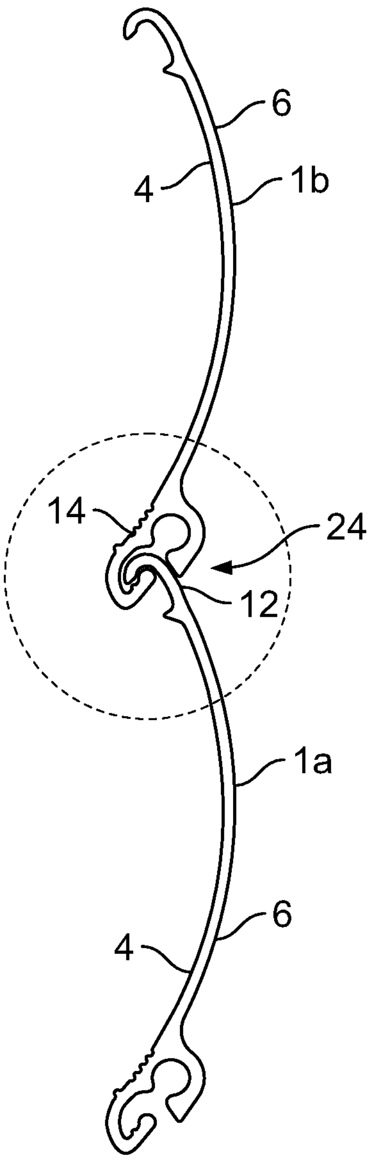
FIG. 2A is a side section view of two linked slats of FIG. 1A.
Figure 2C:
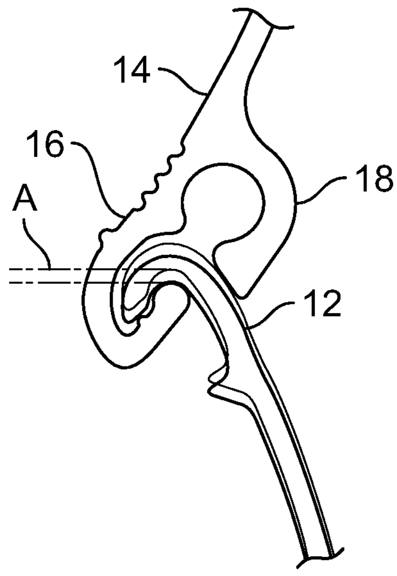
FIG. 2C is a detail, side section view of the hinge between the slats of FIG. 2A, showing the vertical clearance.

FIGS. 2A-2C show an embodiment of two slats 1*a* and 1*b* that are linked together in a vertical position, with the maximum extension of the two linked slats. Engaging track 12 of slat 1*a* is received in the receiving track 14 of slat 1*b* to form an articulating hinge 24 between the two slats. During articulation of hinge 24, bend inner surface 12*f* of engaging track 12 bears on lip member tip 16*c* of receiving track 14. In one embodiment, inner surface 12*f* and tip 16*c* are configured with complementary rounded surfaces that facilitate articulation of hinge 24 and rotation of slats 1*a* and 1*b*, to increase the ease of operation and product life of the slats.

As shown in FIGS. 2B and 2C, hinge 24 is designed to provide engaging track 12 with an increased range of rotation and vertical clearance "A" within receiving track 14 in comparison to conventional rolling shutter slats. The increased range of rotation and vertical clearance accommodates the introduction of debris into articulation space 20, reduces the compression and buildup of debris, and facilitates the self-cleaning of debris from the articulation space. The increased range of rotation and vertical clearance also increases the allowable dimensional tolerances of manufacturing, and improves manufacturability of the slats.

Figure 3A:
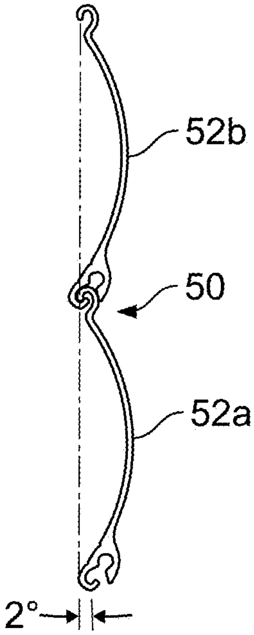
FIG. 3A (Prior Art)
FIG. 3A is a side section view of two prior art linked slats.
Figure 3B:
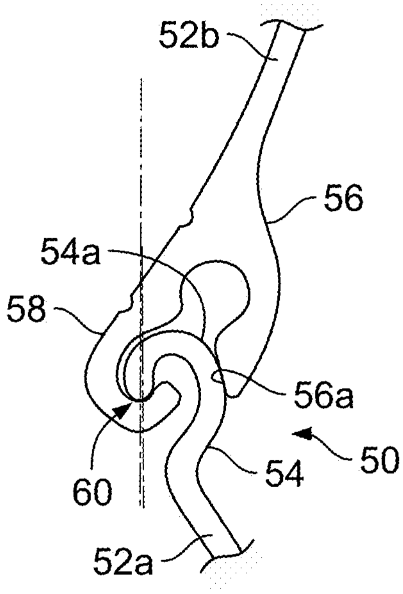
FIG. 3B (Prior Art)
FIG. 3B is a detail side section view of the linked slats of FIG. 3A.
Figure 3C:
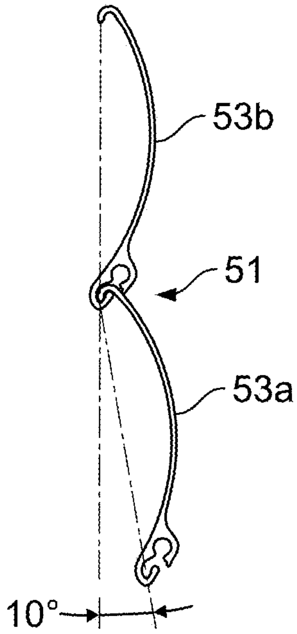
FIG. 3C (Prior Art)
FIG. 3C is a side section view view of another embodiment of two prior art linked slats.
Figure 3D:
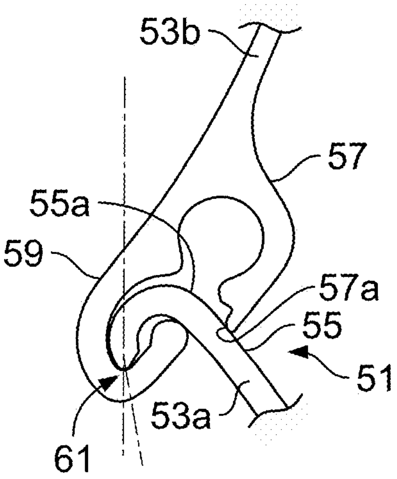
FIG. 3D (Prior Art)
FIG. 3D is a detail side section view of the linked slats of FIG. 3C.

Conventional rolling shutters are typically designed to resist deflection from exterior forces when in the closed (vertical) position, by restricting the backward rotation of the hinge between slats and limiting the clearance of the engaging track within the hinge. As used herein, backward or back rotation means the rotation of two linked slats such that the (convex) outer side 6 of the first slat rotates toward the (convex) outer side 6 of the second slat—e.g., the counterclockwise rotation of slat 1*a* relative to slat 1*b* as shown in FIG. 2A. Examples of prior art rolling shutters are disclosed in U.S. Pat. No. 8,944,137 to Miller (FIGS. 3A and 3B), and U.S. Pat. No. 9,074,411 to Miller et al. (FIGS. 3C and 3D), which are incorporated herein by reference. FIGS. 3A and 3B show prior art linked slats 52*a* and 52*b* that have a hinge 50 designed to have a maximum back rotation of only about 2° from vertical (i.e. counterclockwise rotation of slat 52*a* relative to slat 52*b*). Receiving track guard member tip 56*a* angles sharply toward lip member 58 and is configured to generally conform to the outer surface 54*a* of guard member 54, to limit rotation of slat 52*a* and restrict the back rotation of hinge 50. FIGS. 3C and 3D show prior art linked slats 51*a* and 51*b* that have a hinge 50 designed to limit back rotation to only about 10° from vertical. Receiving track guard member tip 57*a* similarly angles sharply toward lip member 59 to contact the outer surface 55*a* of guard member 55, limit rotation of slat 53*a*, and restrict the back rotation of the hinge 51.

Guard members 56 and 57 are also configured to respectively restrict the vertical movement of engaging tracks 54 and 55, which may contribute to the compression of debris or other material within hinges 50 and 51. In the vertical position, hinges 50 and 51 have minimal vertical clearance. Furthermore, engaging tracks 54 and 55 respectively pivot on inner surfaces 60 and 61 of receiving track lip members 58 and 59. This configuration may cause debris introduced into hinges 50 and 51 to be scraped and compacted at the bottom of the receiving track inner surfaces 60 and 61. Over time, the buildup of debris may impair the rotation of the slats and function of the hinge.

Figure 4B:
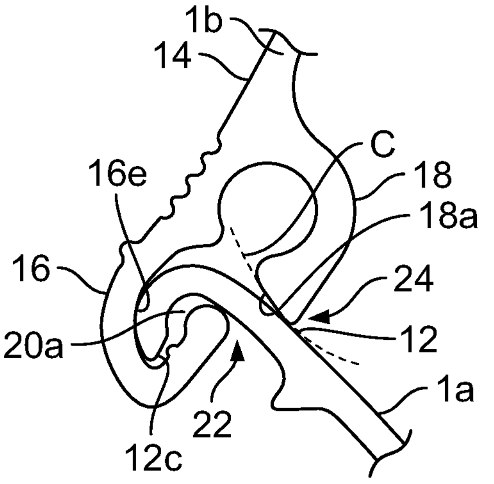
FIG. 4B is a detail, side section view of the hinge between the slats of FIG. 4A.
Figure 4A:
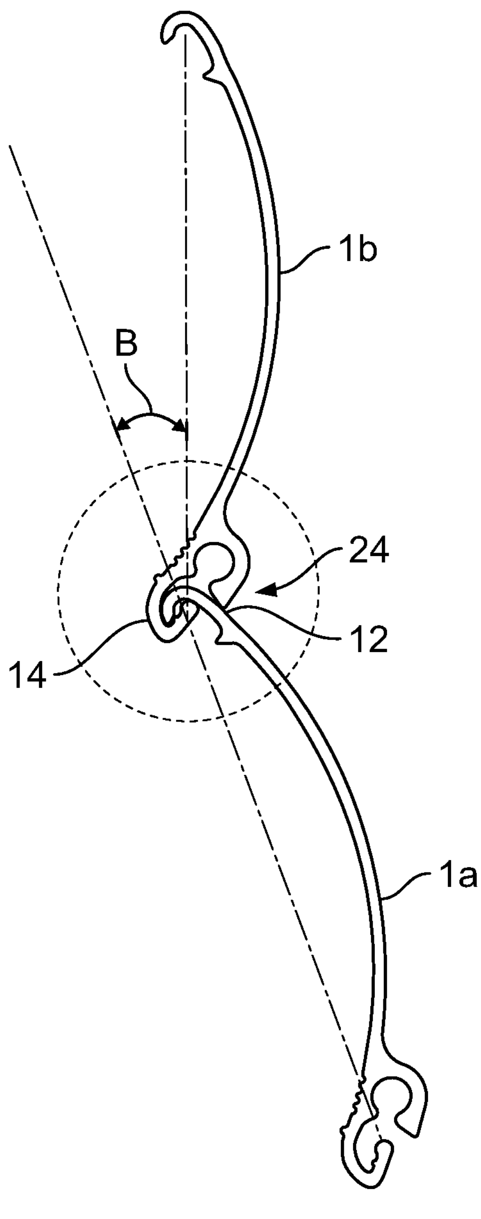
FIG. 4A is a side section view of two linked slats of FIG. 1A, showing the back rotation of the slats.

In one embodiment, the inventive slats are configured to allow back rotation of the hinge substantially beyond vertical. FIGS. 4A and 4B show the back rotation of hinge 24 between linked slats 1*a* and 1*b*. Guard member tip 18*a* has a rounder profile with a convex surface in comparison to the generally concave profile of conventional guard member tips 56*a* and 57*a*, such that aperture 22 allows a greater range of rotation of engaging track 12 in the aperture. In a preferred embodiment, the surface of guard member tip 18*a* has a convex curve "C" with a radius of about 0.25 inches. In contrast to the prior art, slat 1*a* may rotate backward substantially past vertical before guard member tip 18*a* contacts engaging track 12. In one embodiment, guard member 18 is configured such that hinge 24 has a maximum angle of back rotation "B" that is greater than 10°, and preferably at least about 15°. In one embodiment, hinge 24 has a maximum angle of back rotation that is about 18° from vertical (complementary angle between convex outer surfaces 6 of about 162°).

The rounder profile of guard member tip 18*a* also contributes to increased vertical clearance of hinge 24. In one embodiment, when hinge 24 is in the vertical position with linked slats 1*a* and 1*b* in the vertical orientation, engaging track 12 is vertically displaceable within aperture 22 of receiving track 14 by a height "A" (FIG. 2C). Hinge 24 has a vertical clearance "A" of at least about 0.025 inches, and more preferably about 0.0287 inches.

The back rotation and vertical clearance of hinge 24 allow the hinge to accommodate the introduction of debris, and contributes to self-cleaning of debris from the hinge. As engaging track 12 rotates to the vertical position in receiving track articulation space 20, engaging track tip 12*c* scrapes the inner surface 16*e* of the articulation space. As best shown in FIG. 4B, the back rotation of engaging track 12 past vertical, creates an interior space 20*a* within engaging track bend inner surface 12*f*, between engaging track tip 12*c* and receiving track tip 16*c*. Debris introduced into hinge 24 is not compressed, but is pushed into space 20*a*. The vertical clearance of hinge 24 (vertical displacement of engaging track 12) allows the collected debris to be ejected from space 20*a* and escape from the hinge.

Figure 4C:
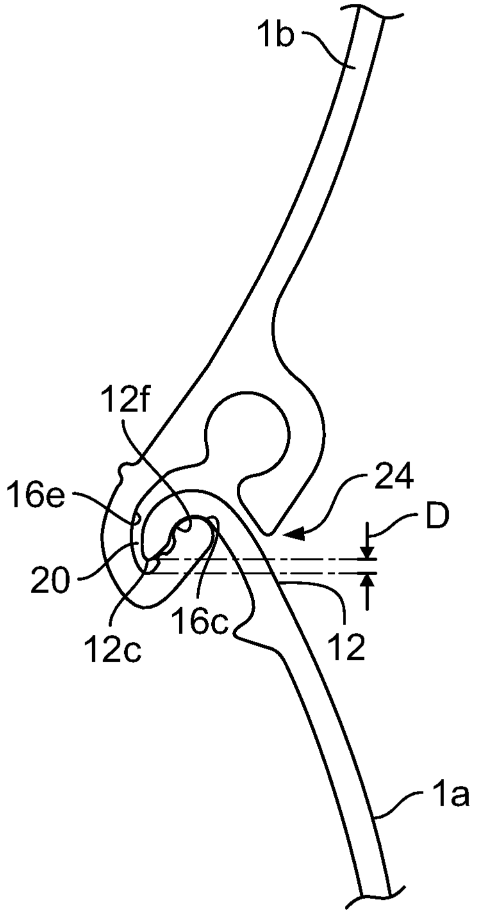
FIG. 4C is a detail, side section view of the hinge between the slats of FIG. 4A in the vertical position, showing the vertical clearance at the tip of the engaging hook and the receiving track.

Compression of debris may also be reduced by configuring hinge 24 such that the engaging track does not pivot on the inner wall of the receiving track. FIG. 4C shows an embodiment of hinge 24 in the vertical position. Engaging track bend inner surface 12*f* pivots on receiving track tip 16*c*. Engaging track tip 12*c* is separated from the bottom of receiving track inner surface 16*e* by a vertical clearance "D". The separation reduces the likelihood that debris will become trapped and compacted within receiving track articulation space 20. In one embodiment, hinge 24 has a vertical clearance "D" of at least about 0.025 inches, preferably between about 0.025 to about 0.03 inches, and more preferably about 0.0265 inches.

Figure 5A:
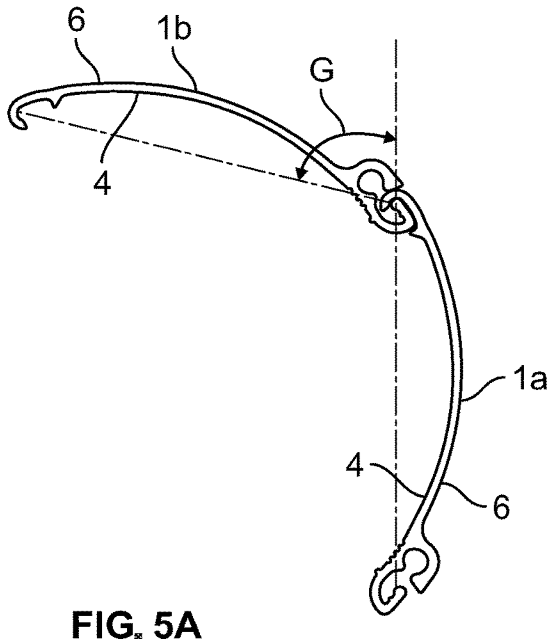
FIG. 5A is a side section view of two linked slats of FIG. 1A, showing the forward rotation of the slats.
Figure 5B:
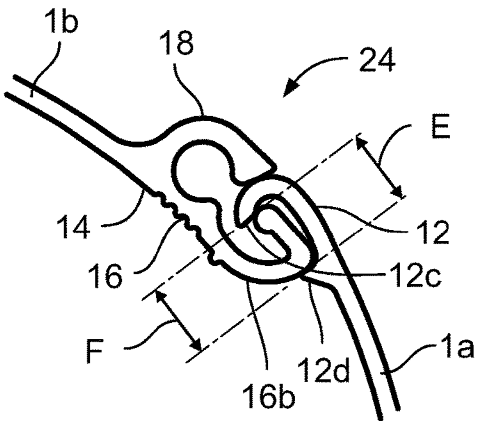
FIG. 5B is a detail, side section view of the hinge between the slats of FIG. 5A.

In some configurations, the rounder profile of guard member tip 18*a* and the increased vertical clearance of hinge 24 may permit the overrotation and inadvertent disengagement or decoupling of the slats. In one embodiment, hinge 24 is configured to prevent overrotation and decoupling of the linked slats. FIGS. 5A and 5B show an embodiment of linked slats 1*a* and 1*b* with an engaging track rib 12*d* spaced apart from engaging track tip 12*c*, that limits the forward rotation of hinge 24. As used herein, forward rotation means the rotation of two linked slats such that the (concave) inner side 4 of the first slat rotates toward the (concave) inner side 4 of the second slat—e.g., the clockwise rotation of slat 1*a* relative to slat 1*b* as shown in FIG. 2A. A portion of receiving track 14 comprising lip member segment 16*f* between tip 16*c* and bend 16*b*, is captured in engaging track 12 between engaging track tip 12*c* and rib 12*d*. The maximum height "E" of lip member segment 16*f* between tip 16*c* and bend 16*b*, is greater than the maximum height "F" between engaging track tip 12*c* and rib 12*d*. As slat 1*a* rotates forward, engaging track rib 12*d* of slat 1*a* contacts receiving track lip member 16 (preferably bend 16*b*) of slat 1*b* to stop the forward rotation of the slat 1*a*.

In general, overrotation is desirable to increase the allowable dimensional tolerances of manufacturing and improve manufacturability of the rolling shutter slats. Preferably, height "E" is only slightly or marginally greater than height "F", to increase the degree of articulation (overrotation) while preventing decoupling. In one embodiment, slats 1*a* and 1*b* form a hinge 24 with a maximum angle of forward rotation "G" (FIG. 5A) of between about 70° to about 80° from vertical, and preferably about 76° from vertical (i.e. complementary angle of 104° between concave inner surfaces 4). In another embodiment, the maximum height "E" of lip member segment 16*f* between tip 16*c* and bend 16*b* is about 0.219 inches, and the maximum height "F" between engaging track tip 12*c* and rib 12*d* is about 0.216 inches.

The use of engaging track rib 12*d* to prevent overrotation provides advantages over conventional slat designs, including consistency in the design of hinge 24. As described below, rolling shutters commonly comprise slats with different heights (i.e. the maximum vertical height of slat 1 between engaging track 12 and receiving track 14) and radii of curvature. In conventional rolling shutter slat designs without an engaging track rib 12*d*, the geometries of the engaging track and/or receiving track are configured to prevent overrotation and decoupling of the hinge. These geometries are not uniform across all slats, but must be modified to reflect the different heights and radii of curvature of the slats. In contrast to conventional slat designs, overrotation is restricted by engaging track rib 12*d*, which allows slats with different heights and radii of curvature to be configured with engaging tracks 12 and receiving tracks 14 that have consistent geometries, and allows hinges 24 to be formed even between slats 1*a* and 1*b* that have substantially different heights and radii of curvature. Engaging track rib 12*d* similarly facilitates the use of accessory slats that may only be available in a single configuration, such as finger pull slats and utility slats described below. In addition, the restriction of overrotation by engaging track rib 12*d* reduces the dependence on guard member 18 to prevent decoupling of hinge 24, which permits reduction of the guard member to provide greater vertical clearance within the hinge.

A rolling shutter curtain is formed of a series of slats 1 that are linked in head-to-tail fashion to form a chain, with the engaging track 12 of a successive slat engaged in the receiving track 14 of the preceding slat in the chain. In the closed position, the slats 1 are extended (vertically) to cover the opening of a host structure. In the open position, the slats 1 are retracted (raised) from the opening by coiling or winding the linked slats about a spindle. The retracted rolling shutter typically comprises multiple windings of slats 1 that substantially encircle the spindle. The windings of slats are preferably tightly nested to minimize the space required by the retracted rolling shutter.

Figure 6A:
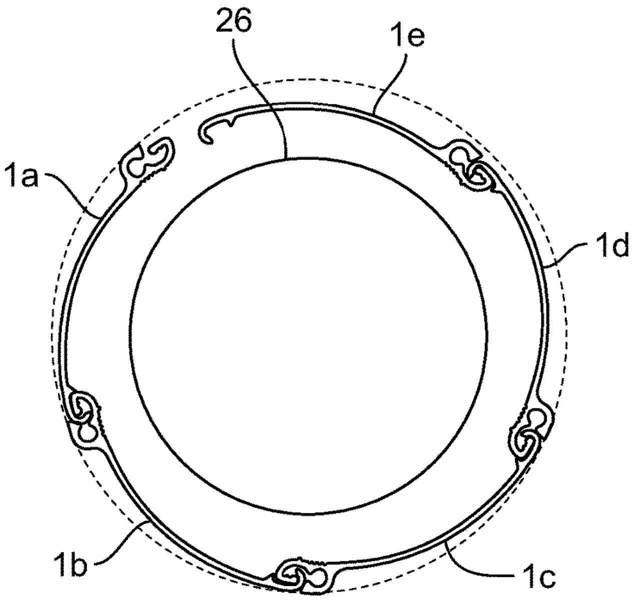
FIG. 6A is a side section view of a series of linked slats of FIG. 1A, that form single a winding of slats about a spindle.

FIG. 6A shows an embodiment of a single winding, comprising five slats 1*a*-1*e* wound about a spindle 26. Adjacent slats in the winding (e.g., 1*a* and 1*b*) have a standard forward rotation angle of about 69° from vertical. In one embodiment, each winding comprises the same number of slats, which permits the alignment of slats in successive windings to facilitate tight nesting.

Figure 6B:
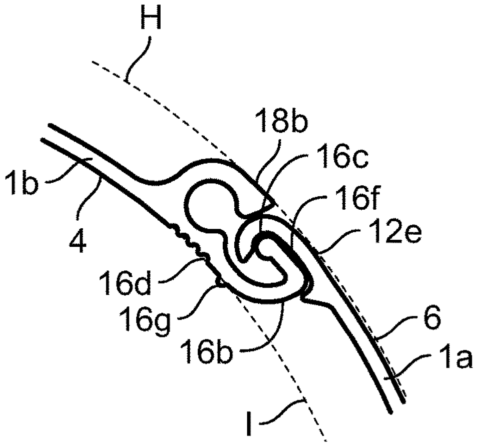
FIG. 6B is a detail, side section view of the hinge between two linked slats of FIG. 6A, showing the alignment of the slat surfaces.

Tight nesting may be further improved by configuring the slats to form windings with concentric surfaces. In the embodiment of FIGS. 6A and 6B, the slats form a winding with concentric outer and inner surfaces "H" and "I". Guard member outer surface 18*b* of slat 1*b* and engaging track base outer surface 12*e* of slat 1*a* are aligned and extend along the same curve as convex body outer surface 6 of slat 1*a*, to form a combined winding outer surface "H". Similarly, lip member base outer surface 16*d* of slat 1*b* extends along the same curve as body concave inner surface 4 of slat 1*b*, to form a combined winding inner surface "I". In a preferred embodiment, the curves of winding outer and inner surfaces H and I are approximately concentric (i.e. share a center point located on the longitudinal axis of spindle 26) to improve tight nesting of adjacent windings when the rolling shutter is in the retracted position. In one embodiment, lip member segment 16*f* has an outer surface that is also concentric with inner and outer surfaces D and E, to facilitate the alignment of engaging track base outer surface 12*e* with guard member outer surface 18*b*.

The tightly nested configuration of the retracted rolling shutter increases the risk of wear caused by contact between the slats of adjacent windings. In one embodiment, a wear rib or bump 16*g* is positioned on the inner surface of slat 1 (i.e surfaces 4 and 16*d*), to reduce contact between the slats in the retracted position. Wear bump 16*g* is preferably located at a position that has a high probability of contact with a slat of the adjacent (previous) winding, such as the region of hinge 24. In one embodiment, wear bump 16*g* is positioned on lip member outer surface 16*d*. Wear bump 16*g* creates separation between the slats of adjacent windings, by reducing the face-to-face contact between slats to the minimal area of the wear bump, which reduces inadvertent damage to the surface finish of the slats and increases product life.

Figure 6C:
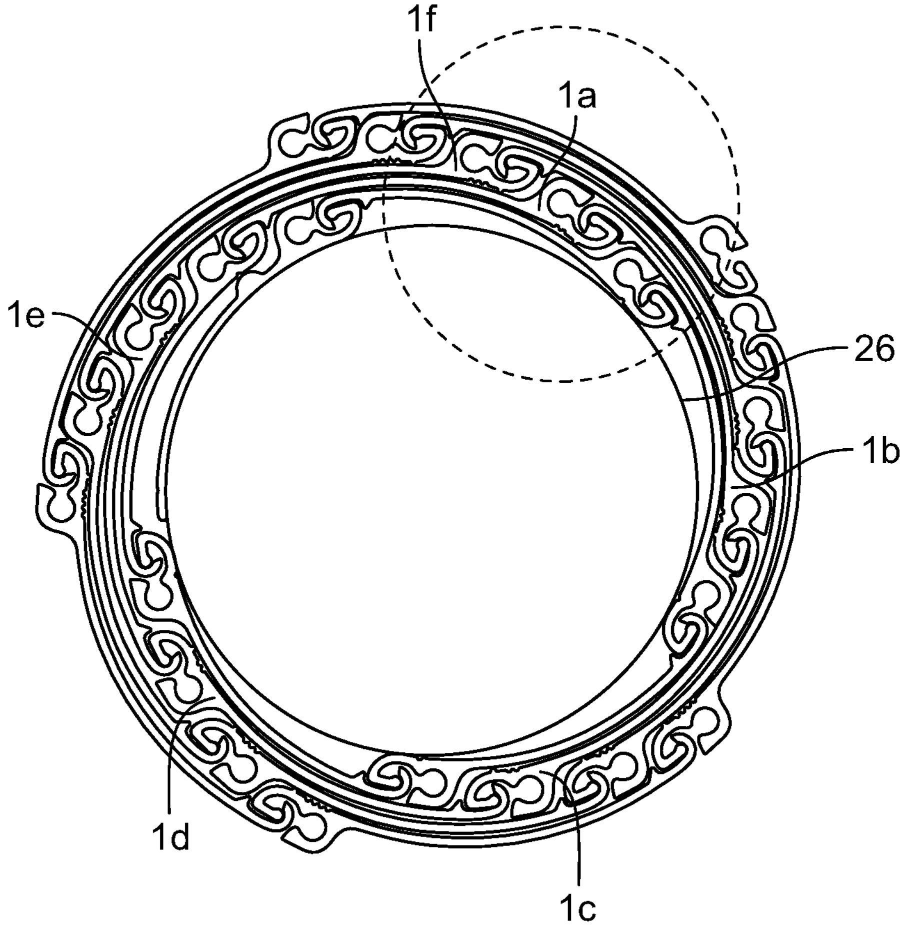
FIG. 6C is a side section view of a rolling shutter comprising a series of linked slats of FIG. 1A, that form multiple tightly nested windings of slats about a spindle.
Figure 6D:
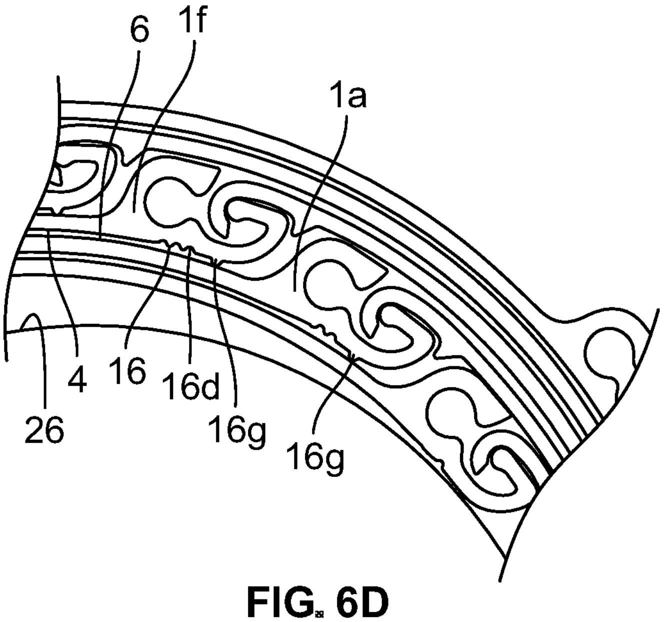
FIG. 6D is a detail, side section view of the rolling shutter of FIG. 6C.

FIGS. 6C and 6D show a rolling shutter in the retracted position, wound or coiled about spindle 26 in a tightly nested configuration. The rolling shutter coil includes a winding comprising five slats 1*a*-1*e*, with slat 1*a* overlapped by slat if in the successive winding. A wear bump 16*g* is positioned on lip member 16 at outer surface 16*d* of each slat, to separate the adjacent (overlapping) slats of successive windings. As shown in FIG. 6D, wear bump 16*g* of slat 1*e* reduces the face-to-face contact between the adjacent winding inner and outer surfaces in the coil—e.g., between slat if body inner surface 4 and lip member outer surface 16*d* (inner surface "I"), and slat 1*e* body outer surface 6 (outer surface "H").

Wear bump 16*g* also increases the allowable dimensional tolerances of manufacturing and improves manufacturability of the rolling shutter slats. For example, the separation between slats created by wear bump 16*g* accommodates variations in the concentricity of adjacent windings. Conversely, the concentricity of the slats can be adjusted by simply changing the size of wear bump 16, rather than redesigning the slat dimensions and curvature.

Those of skill in the art will appreciate that the circumference of each successive winding of slats will increase the further from the spindle. Therefore, the height of the slats must increase in each successive winding to accommodate the increasing circumference and maintain the same number of slats in each winding—i.e. the maximum vertical height of slat 1 between engaging track 12 and receiving track 14 generally increases the further from the spindle. The radius of curvature of the slats also must increase in each successive winding to maintain the concentricity of the windings. In a one embodiment, the height and radius of curvature of the slats in a rolling shutter curtain increases monotonically the further from the spindle.

Figure 8A:
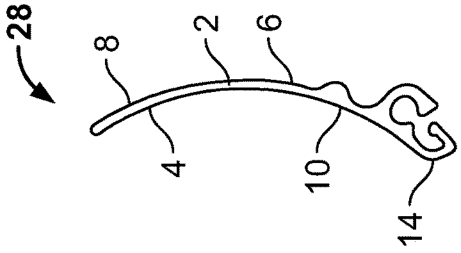
FIG. 8A is a side section view of an embodiment of a starter slat for a rolling shutter.
Figure 9:
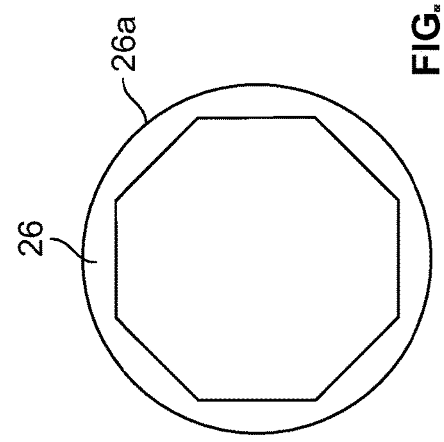
FIG. 9 is a side section view of an embodiment of a spindle for a rolling shutter.

An initial starter slat of the rolling shutter curtain is coupled to the spindle. FIGS. 8A and 9 shown an embodiment of a spindle 26 and a corresponding starter slat 28. Spindle 26 is generally cylindrical, with an outer surface 26*a*. Starter slat 28 is a partial slat with a similar configuration to slat 1, comprising a body 2 having a curvature with a concave inner surface 4 and a convex outer surface 6. Starter slat 28 has a top and bottom edges 8 and 9, with a receiving track 14 positioned at bottom edge 10. However, starter slat 28 does not include an engaging track at top edge 8. The curvature of starter slat body 2 (and preferably the curve of concave inner surface 4) conforms to the curvature of spindle outer surface 26*a*. Starter slat 28 may be coupled to spindle 26 using various fasteners as are known in the art. For example, starter slat 28 may be attached to spindle 26 using screws.

Figure 8B:
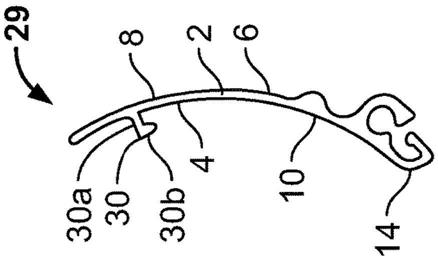
FIG. 8B is a side section view of an alternative embodiment of a starter slat for a rolling shutter.
Figure 10:
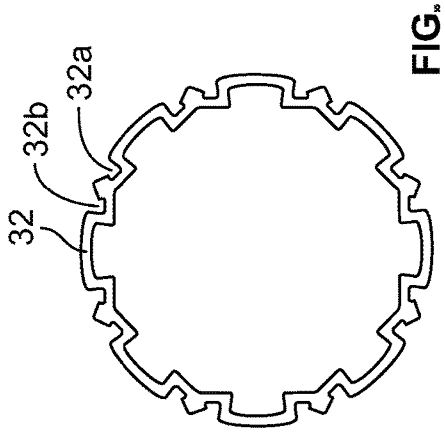
FIG. 10 is a side section view of an alternative embodiment of a spindle for a rolling shutter.

The starter slat and spindle may also be configured to be coupled without a fastener. FIGS. 8*b* and 10 show an embodiment of a spindle 32 and complementary starter slat 29. Starter slat inner surface 4 has a flange 30 positioned at edge 8, and spindle 32 has one or more complementary channels 32*a* that are sized and shaped to receive flange 30. In a preferred embodiment, flange 30 is generally L-shaped, having a stem 30*a* and leg 30*b*. Channel 32*a* is sized and shaped for hook-in or snap-fit insertion of L-shaped flange 30 into the channel to couple starter slat 29 to spindle 32. In one embodiment, spindle 32 may include one or more channels 32*b* that are a mirror image of channel 32*a*, to allow starter slat 28 to be coupled to the spindle in the opposite orientation to coupling to channel 32*a*. Starter slat 29 is coupled to spindle 32 with receiving track 14 extending around the spindle in the counterclockwise direction when flange 30 is received in channel 32*a*, and extending in the clockwise direction when flange 30 is received in channel 32*b*.

Figure 7A:
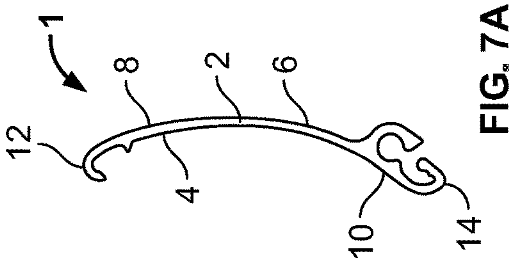
FIG. 7A is a side section view of an embodiment of a rolling shutter slat, dimensioned to be incorporated in a winding proximal to the spindle.
Figure 7B:
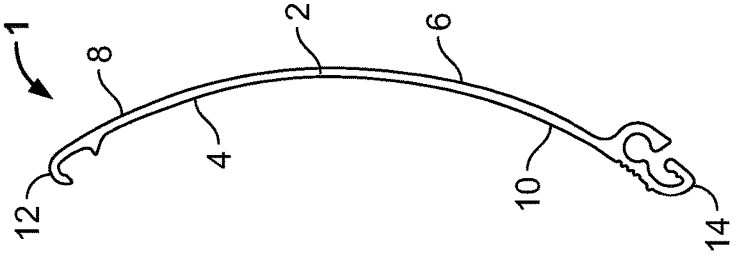
FIG. 7B is a side section view of an embodiment of a slat, dimensioned to be incorporated in a winding distal to the spindle.

In a preferred embodiment, the rolling shutter has a spindle 26 with an outer diameter of about 3.325 inches, and comprises a series slats having monotonically increasing heights (i.e. maximum height between engaging track 12 and receiving track 14) selected from the progression: 2.3118, 2.4618, 2.6180, 2.7787, 2.9446, 3.1170, 3.2699, 3.4265, 3.5877, 3.7543, 3.9275, and 4.0971 inches. Sequential slats in the series have a maximum difference in slat height of about 6% (i.e. between sequential slat heights of 2.3118 and 2.4618 inches). The difference between non-sequential slat heights ranges from a minimum of about 8.5% (3.7543 to 4.0971 inches) to a maximum of about 43.5% (2.3118 to 4.0971 inches). FIGS. 7A and 7B show a comparison of a slat in an initial winding proximal to the spindle having a height of about 2.3118 inches, and a slat in a terminal winding distal to the spindle having a height of about 4.0971 inches. In an alternative embodiment, the rolling shutter has a spindle 32 comprising a snap-in drive tube (e.g., FIG. 5) with an outer diameter of about 3.315 inches.

As discussed above, rib 12*d* enables the formation of hinges 24 between slats having substantially different heights and radii of curvature. In the aforementioned embodiment of a progression of slat heights, hinge 24 may be formed between non-sequential slats having a difference in slat height of at least about 7%. In another embodiment, hinge 24 is formed between non-sequential slats having a difference in slat height ranging between about 9% to about 45%.

To accommodate different spindle diameters, the quantity of identical slats present in the initial layer (winding) of slats can be altered from the standard value. In this arrangement, a certain quantity of slats equal to or less than a standard value can be used before progressing through the standard slat groups to achieve a nested configuration. Further, any subset of the standard slat groups can be used. In one embodiment, this alternate slat configuration may be used in the manufacture of shutters that exceed the mechanical limits of the standard spindles.

To optimize the slat profile sequence for a standard enclosure size, a subset of the curtain may be designed to utilize a nested configuration before transitioning to a standard non-nested configuration. This subset of nested curtain groups can be adjusted to be optimized for geometry, cost, manufacturability, or shutter strength in the field. In particular, the slat configuration can be optimized for different security levels at different points in the curtain.

Figure 11:
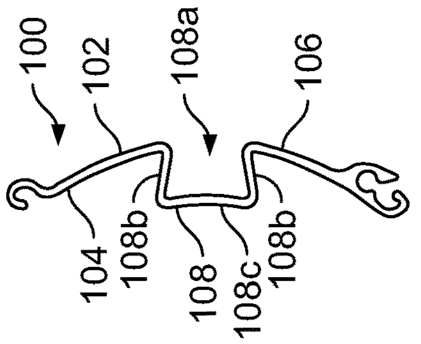
FIG. 11 is an accessory slat for a rolling shutter, comprising an embodiment of a finger pull.

The rolling shutter system may also comprise one or more accessory slats, such as a finger pull slat, coupler, base slat, and/or utility slat that are incorporated in the series of slats 1. Referring to FIGS. 11-19, embodiments of the slats, accessory slats and slat couplers of a rolling shutter system are shown. In one embodiment, the rolling shutter system includes a finger pull slat to facilitate manual operation of the rolling shutter. An example of a finger pull slat 100 is shown in FIG. 11, that has a similar configuration to slat 1, including a single-walled body 102 having a curvature with an inner side or surface 104 having a concave curve, and an outer side or surface 106 with a convex curve. Slat 100 further comprises a projection 108 formed in body 102 that provides a handle for manually raising or lowering the rolling shutter. In one embodiment, projection 108 is formed as a generally U-shaped channel in body 102 that has an opening 108*a* on outer side 106, and that projects from inner side 104 to create a handle surface 108*b*. In a preferred embodiment, the base 108*c* of the U-shaped channel has a curvature that is concentric with the curvature of body 102, to facilitate tight winding of the rolling shutter in the retracted position. An operator may either grasp handle 108*b* from the inside of the rolling shutter, or insert their fingers into opening 108*a* from outside the rolling shutter. Those of skill in the art will appreciate that projection 108 may be formed with the reverse configuration—i.e. with an opening on inner side 104 and a handle projecting from outer side 106.

Figure 13:
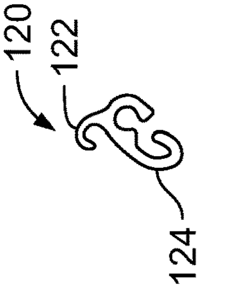
FIG. 13 is a side section view of an accessory slat for a rolling shutter, comprising an embodiment of a slat coupler.

In one embodiment, the rolling shutter system includes a coupler slat for adapting a rolling shutter to incorporate multiple different slat designs. Rolling shutter slats may be designed to emphasize different features which are reflected in the configuration and geometries of the engaging tracks and receiving tracks, such as tight nesting of the coiled shutter, or hinges with improved water resistance. FIG. 13 shows an embodiment of a coupler 12 for linking two slats having different designs. Coupler 120 comprises an engaging track 122 configured for a first slat design, and a receiving track 124 configured for a second slat design. In a preferred embodiment, coupler 120 does not include a body separating engaging track 122 and receiving track 124, to minimize the profile of the coupler in the rolling shutter and the separation between the two different slats.

In one embodiment, the rolling shutter system may include a base slat that is positioned at the end of the series of linked slats to contact the bottom of the opening in a host structure, when the rolling shutter is in the closed position. The base slat may include a seal and/or may be shaped to conform to the bottom of the opening to prevent gaps that would allow infiltration or the insertion of a pry tool. The base slat may also include a locking device for securing the rolling shutter in the closed position and prevent it from being raised from the bottom of the opening.

Figure 14:
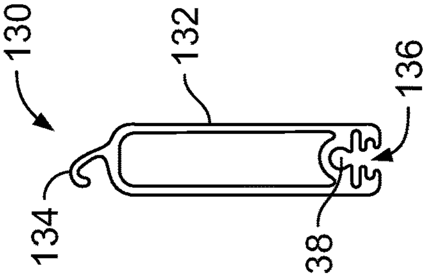
FIG. 14 is a side section view of an accessory slat for a rolling shutter, comprising an embodiment of a base slat.
Figure 15:
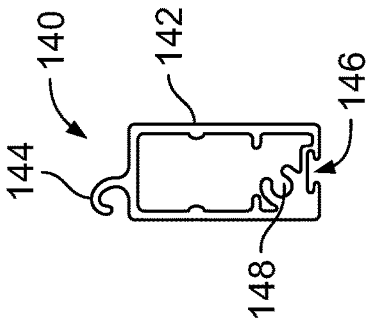
FIG. 15 is a side section view of an accessory slat for a rolling shutter, comprising an alternative embodiment of a base slat.

FIGS. 14-18 show base slats configured for a variety of different applications. FIGS. 14, 15 show embodiments of a large base slat 130 and small base slat 140. Large base slat 130 is generally configured for use in rolling shutter applications for building structures such as a doorway or window. Small base slat 140 is generally configured for use in smaller structures and furnishings, such as security cabinets, counters, and display cases. Base slats 130, 140 have double-walled bodies 132, 142 with an engaging track 134, 144 at a top end, and a channel 136, 146 formed at the bottom end. Channel 136, 146 are configured to receive a gasket or seal to allow the bottom end of base slats 130, 140 to better conform to the bottom of the opening of the host structure. In one embodiment, base slats 130, 140 may include a receptacle 138, 148 that may serve as a screw boss for an end retention device (as described below), or may be configured to receive a simple end plug or bushing (not shown) as are known in the art.

Figure 16:
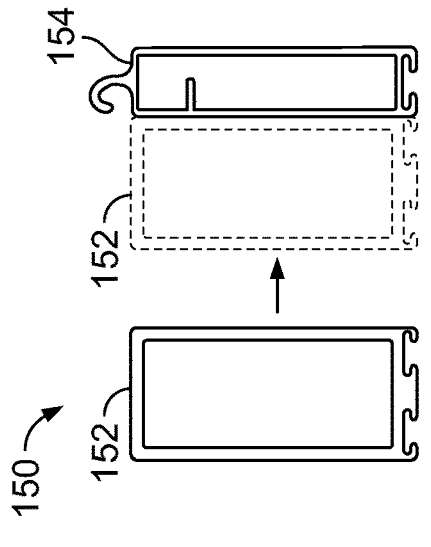
FIG. 16 is a side section view of an accessory slat for a rolling shutter, comprising an embodiment of a housing for a base slat.

FIG. 16 shows a housing 152 which is coupled to a base slat 154, to provide additional strength and stiffness. Housing 152 has a generally rectangular cross-section that is sized and shaped to conform to base slat 154, which may have a standard configuration such as base slat 130 (FIG. 14). Housing may be coupled to base slat 154 by one or more fasteners as are known in the art, such as screws or bolts.

Figure 17:
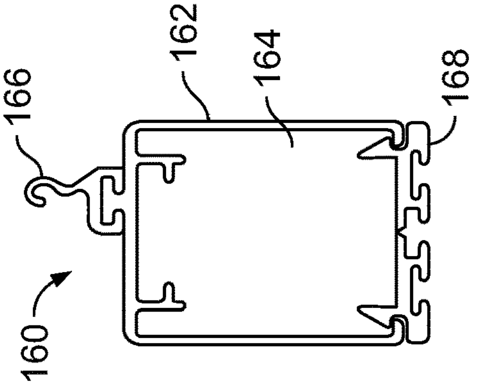
FIG. 17 is a side section view of an accessory slat for a rolling shutter, comprising an alternative embodiment of a base slat.

FIG. 17 shows a base slat 160 having a body 162 with an internal space 164 that is configured to receive additional functionality, such as a rolling shutter locking device (not shown). Base slat 160 has a top end with a removable coupler 166 that comprises an engaging track, and a removable bottom 168. Coupler 166 may be provided with different engaging track configurations to allow base slat 160 to be adapted for use with different rolling shutter designs. Bottom 168 is removable to provide convenient access to internal space 164 for installation of a locking device or other feature.

Figure 18:
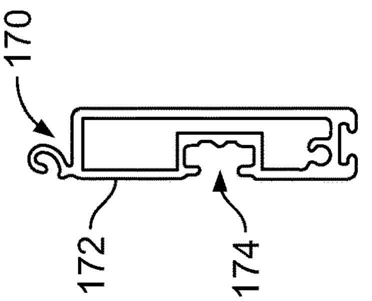
FIG. 18 is a side section view of an accessory slat for a rolling shutter, comprising an alternative embodiment of a base slat.

FIG. 18 shows a base slat 170 that has a body 172, with a channel 174 that is configured to receive a removable handle (not shown) to facilitate manual raising or lowering of the rolling shutter. In one embodiment, channel 174 is C-shaped and configured for snap-fit insertion of a handle.

Figure 19:
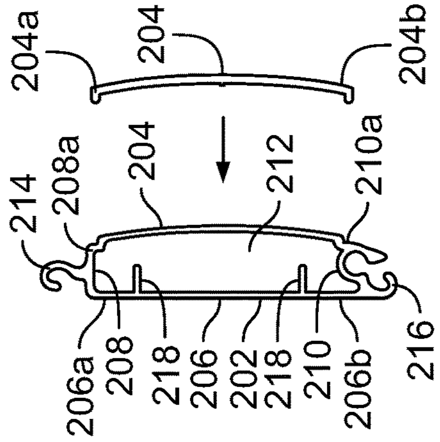
FIG. 19 is a side section view of an accessory slat for a rolling shutter, comprising an embodiment of a lock slat and cover.

In one embodiment, the rolling shutter system may include a utility slat with an interior space that can be modified to add functionality to the rolling shutter, such as a locking system or a reinforcing bar for the rolling shutter. An example of a utility slat 200 is shown in FIG. 19, that comprises a body 202 and a cover 204. Utility slat body 202 forms a generally U-shaped channel that comprises a base 206, and walls 208 and 210 that define an interior space 212. The ends 208*a* and 210*a* of walls 208 and 210 define the opening into interior space 212. Cover 204 is secured to body 202 to cover the opening and enclose interior space 212.

In one embodiment, cover 204 has edges 204*a* and 204*b*, with a height between edges 204*a* and 204*b* that is sufficient to cover the opening between ends 208*a* and 210*a*. Ends 208*a* and 210*a* are configured to respectively receive edges 204*a* and 204*b* and secure cover 204 to body 202. In one embodiment, cover 204 is removably secured to body 202. In a preferred embodiment, edges 204*a* and 204*b* are secured to ends 208*a* and 210*a* by snap fit insertion.

Utility slat 200 is preferably designed to be seamlessly incorporated in the rolling shutter at various positions in the sequence of slats. Utility slat 200 has an engaging track 214 and a receiving track 216 that are similar to or otherwise compatible with engaging track 12 and receiving track 14 of slat 1. In one embodiment, an engaging track 214 and a receiving track 216 are positioned at opposite ends 206*a* and 206*b* of base 206. In a preferred embodiment, engaging track 214 and receiving track 216 are respectively positioned on walls 208 and 210, and may form at least part of walls 208 and/or 210. In one embodiment, utility slat cover 204 has the same convex outer profile as outer side or surface 6 of slat 1, when the rolling shutter is in the extended or closed position.

Utility slat interior space 212 may be sized and shaped to receive a variety of different features, such as a cut-resistant bar or other device to increase the security of the rolling shutter. In one embodiment, a locking device is received in interior space 212 to secure the rolling shutter in a closed or partially closed position. One or more flanges 218 may project into interior space 212 from base 206, cover 204, and/or walls 208 and 210 to position and support the locking device or other feature within the interior space.

The rolling shutter may include an end retention system that comprises a retaining rail or guide track positioned at the sides of the opening in the host structure. The guide track is configured to receive the ends of the slats and secure the slats in position to cover the opening of the structure. An end retention device is secured to the ends of the slats, and is received in the guide track to align and prevent disengagement of the slat ends from the guide track. The ends of the slats may be configured with a receptacle for receiving an end retention device, such as a fastener with a washer that is retained within a channel of the guide track. Examples of end retention systems are described in U.S. Pat. Nos. 8,616,261 and 8,925,617 to Miller, which are incorporated herein by reference.

Figure 21B:
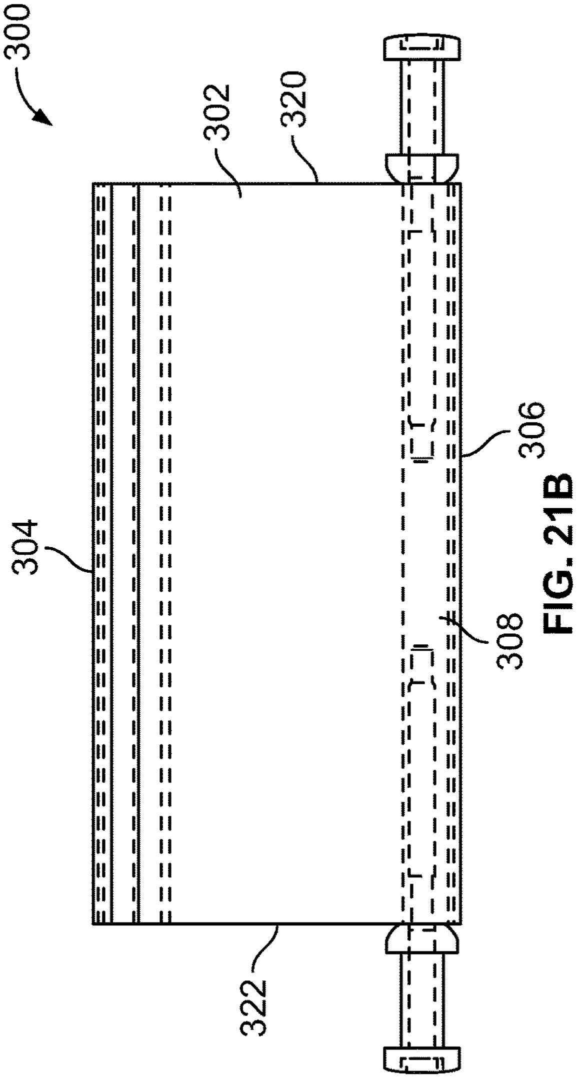
FIG. 21B is a front view of the rolling shutter slat and end retention device of FIG. 21A, showing hidden lines.
Figure 21C:
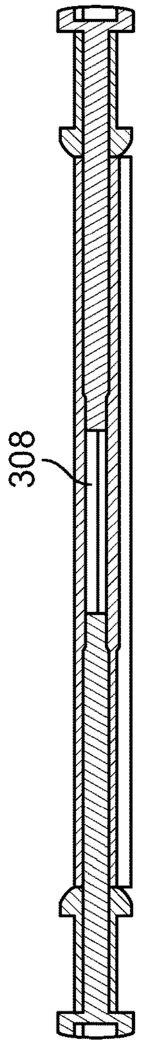
FIG. 21C is a bottom section view of the rolling shutter slat and end retention device of FIG. 21A.
Figure 20:
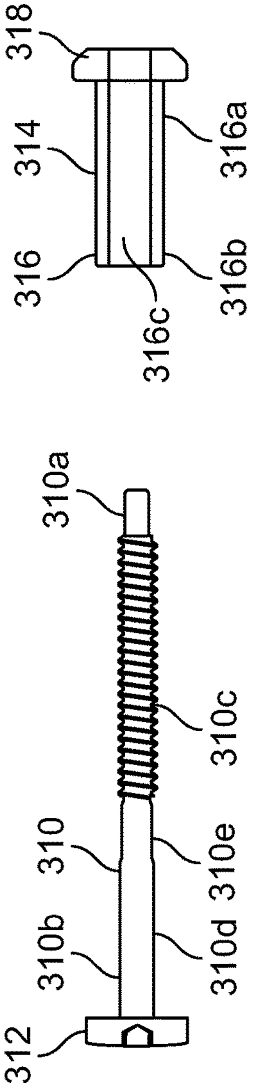
FIG. 20 is a side section view of an embodiment of an end retention device for a rolling shutter slat, comprising a retaining screw and bushing.
Figure 21A:
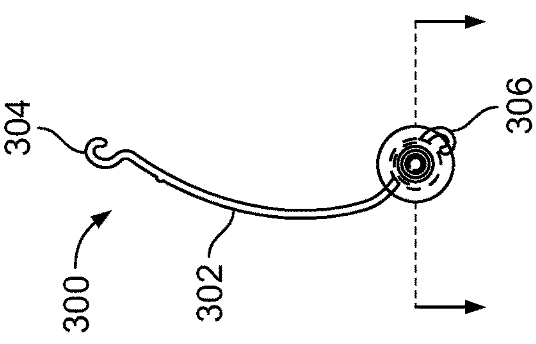
FIG. 21A is a side view of the end retention device of FIG. 20 installed in an embodiment of a rolling shutter slat.

FIGS. 20 and 21 show an embodiment of a slat and an end retention device. Slat 300 has a body 302, an engaging track 304, and a receiving track 306. Receiving track 306 is similar to receiving track 14 of slat 1, and includes a receptacle 308 for receiving the end retention device that is similar to receptacle 34 (FIG. 1C).

The end retention device comprises a first end that secures the end retention device to a slat, and a second end that engages a guide track. In one embodiment, the end retention device is a retaining screw 310 with first and second ends 310*a* and 310*b*. End 310*a* includes a threaded portion 310*c* for securing the retaining screw to slat 300. A retaining screw head or flange 312 is positioned at end 310*b*, for engaging a guide track. In a preferred embodiment, end 310*b* includes an unthreaded portion 310*d* adjacent to flange 312.

In one embodiment, the end retention device further includes a bushing 314 that comprises a cylindrical body 316 with first and second ends 316*a* and 316*b*, and a bore 316*c* that is sized and shaped to receive retaining screw 310. A bushing head or flange 318 is positioned at the first end 316*a* of body 316. The end retention device is assembled by inserting retaining screw 310 through bore 316*c* and positioning bushing 314 at end 310*b*. Bushing end 136*b* is positioned proximal or adjacent to retaining screw flange 312, such that bushing flange 318 and the retaining screw flange are spaced apart by body 316. In a preferred embodiment, bushing 314 is positioned over the unthreaded portion 310*d* of retaining screw 310.

Retaining screw end 310*a* is received in slat receptacle 308, to couple the end retention device to the ends 320 and/or 322 of slat 300. In one embodiment, receptacle 308 of slat 300 is sized and shaped to provide a screw boss for retaining screw threaded portion 310*c*, to secure the end retention device to the slat. Retaining screw flange 312 (and spaced apart bushing flange 318) projects from slat ends 320 and 322, to engage the guide track of an end retention system.

Under load conditions, the end retention device experiences high stresses at the point of engagement with the slat. In one embodiment, the unthreaded portion 310*d* of retaining screw 310 includes a section 310*e* adjacent to threaded portion 310*c*, that has a diameter that is approximately the diameter of the screw boss (receptacle 308). Retaining screw 310 is configured such that unthreaded section 310*e* becomes embedded within receptacle 308 and slat end 320 (or 322), to provide a stronger connection than if this transition occurred over a threaded portion of the screw, as shown in FIGS. 21B and 21C.

Figure 22A:
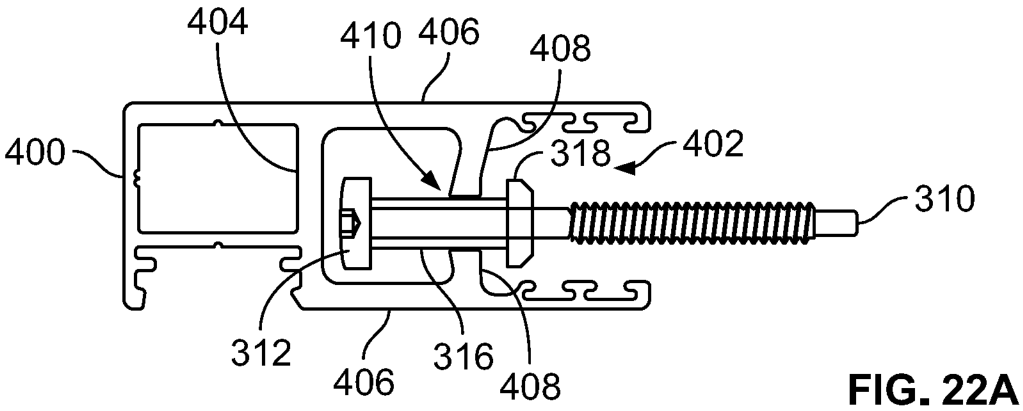
FIG. 22A is a top section view of an embodiment of a guide track and the end retention device of FIG. 20.

FIG. 22A shows an embodiment of a guide track 400, that comprises a U-shaped channel 402 formed by a base 404 and walls 406. Channel 402 is sized and shaped to receive a slat end 320 or 322 coupled to an end retention device, to retain and guide the longitudinal movement of the slat within the channel. In one embodiment, flanges 408 project from walls 406 into channel 402, to form a guide slot 410 that is sized and shaped to receive bushing body 316. The movement of bushing body 316 in slot 410 guides the longitudinal movement of the end retention device (retaining screw 310 and bushing 314) and slat 300 within guide track channel 402. Retaining screw flange 312 has a larger width or diameter than the width of guide slot 410, such that the retaining screw flange is captured by the guide slot and is prevented from being withdrawn from channel 402. Bushing flange 318 also has a larger width or diameter than guide slot 410, such that the transverse movement of the end retention device in guide track 400 is limited by the length of bushing body 316 between the retaining screw flange and bushing flange.

Figure 22B:
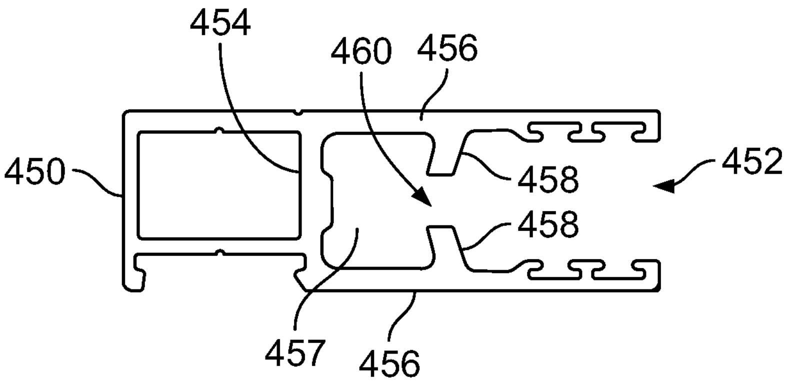
FIG. 22B is a top section view of an alternative embodiment of a guide track and the end retention device of FIG. 20.

In the embodiment of FIG. 22A, flanges 408 have different heights, such that slot 410 is positioned off-center within channel 402, and the end retention device and slat 300 are positioned closer to one of walls 406 of guide track 400. FIG. 22B shows an alternative embodiment of a guide track 450 with a similar structure to guide track 400, that comprises a channel 452 defined by base 454 and walls 456. Flanges 458 project from walls 456 into channel 452, to form a guide slot 460 that is sized and shaped to receive bushing body 316 and capture retaining screw flange 312. Guide slot flanges 458 project from walls 456 at approximately the same height, such that guide slot 460 is equidistant from walls 456 and is centered within channel 452.

Figure 23A:
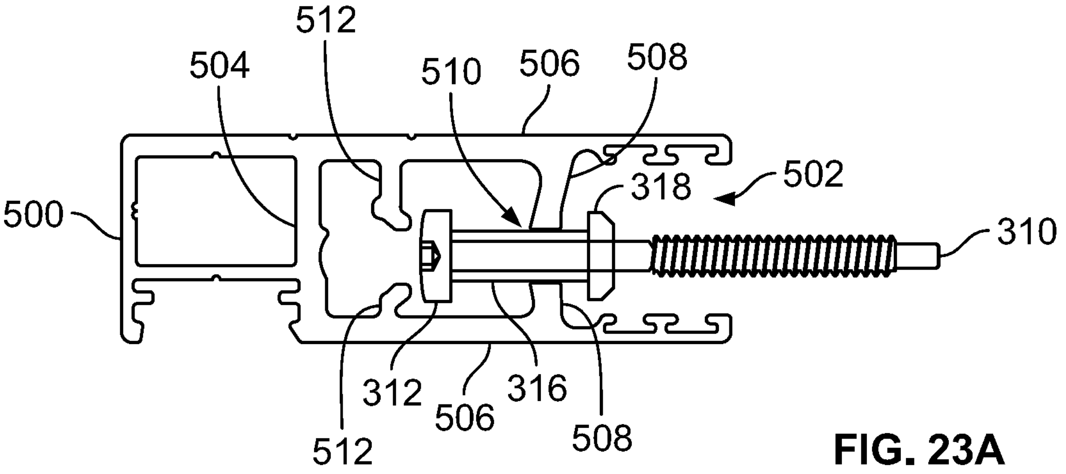
FIG. 23A is a top section view of an alternative embodiment of a guide track and the end retention device of FIG. 20.

In yet another embodiment, the guide track may include a stop within the channel that limits the transverse movement of the end retention device and slat 300 into the guide track channel. FIG. 23A shows a guide track 500 with a similar structure to guide track 400, that comprises a channel 502 defined by base 504 and walls 506. Flanges 508 project from walls 506 into channel 502, to form a guide slot 510 that is sized and shaped to receive bushing body 316 and capture retaining screw flange 312. A stop comprising one or more stop flanges 512 is formed within channel 502, between base 504 and guide slot flanges 508. Stop flanges 512 are positioned to contact retaining screw flange 312 as the end retention device and slat 300 move transversely into guide track channel 502.

Similarly to guide track 400, guide slot flanges 508 project from walls 506 at different heights, such that guide slot 510 is positioned off-center within channel 502, and the end retention device and slat 300 are positioned closer to one of walls 506 of guide track 500. In one embodiment, each stop flange 512 projects from wall 506 at about the same height as the guide slot flange 508 projecting from the same wall.

Figure 23B:
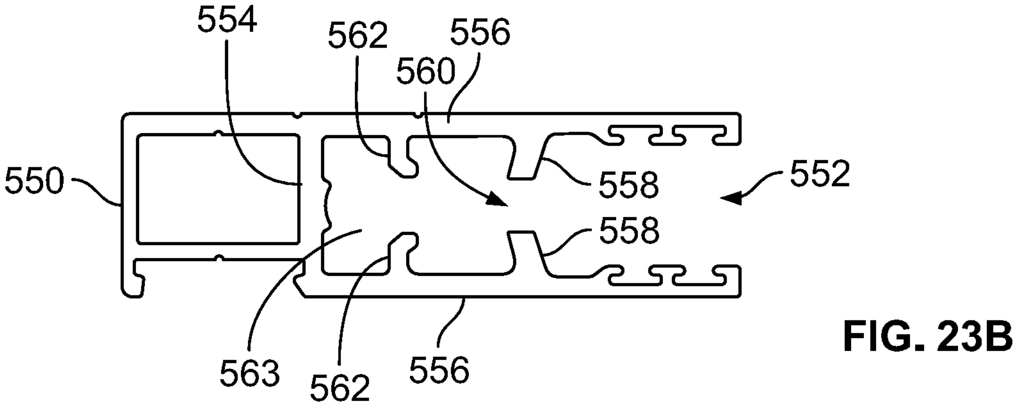
FIG. 23B is a top section view of an alternative embodiment of a guide track and the end retention device of FIG. 20.

FIG. 23B shows an alternative embodiment of a guide track 550 with a similar structure to guide track 500, that comprises a channel 552 defined by base 554 and walls 556. Flanges 558 project from walls 556 into channel 552, to form a guide slot 560 that is sized and shaped to receive bushing body 316 and capture retaining screw flange 312. A stop comprising one or more stop flanges 562 is formed within channel 552, between base 554 and guide slot flanges 558. Stop flanges 512 are positioned to contact retaining screw flange 312 as the end retention device and slat 300 move transversely into guide track channel 502.

Guide slot flanges 558 project from walls 556 at approximately the same height, such that guide slot 560 is equidistant from walls 556 and is centered within channel 552. In one embodiment, each stop flange 562 projects from wall 556 at about the same height, and preferably project from wall 556 at about the same height as guide slot flanges 558.

The guide track may also include a stop within the channel, to prevent the rolling shutter from being inadvertently raised out of the guide track—e.g., when the rolling shutter is retracted to the open position. For example, a spring may be positioned in the channel at the top of the guide track to provide a resilient stop (not shown). A slat in the rolling shutter (e.g., a base slat) may include a stop bar (not shown) projecting into the channel and aligned to engage the channel stop and prevent inadvertent removal of the rolling shutter from the guide track. In one embodiment, one or more flanges that project within the channel may be configured to form or receive a guide channel stop. For example, flanges 458 and base 454 may form a receptable 457 (FIG. 22B) within channel 452 that is sized and shaped to receive a stop, such as a spring (not shown). Similarly, flanges 562 and base 554 may form a receptacle 563 (FIG. 23B) within channel 552 that is sized and shape to receive a stop.

In one embodiment, the rolling shutter system includes a base slat with an end retention system to increase the security provided in a closed or extended position. Base slat end retention increases resistance to pry and prevents the disengagement of lock bars from guide rails. In a preferred embodiment, the base slat incorporates the same guide track and end retention system as the rolling shutter slats. For example, the base slat may include a receptacle for receiving an end retention device, such as such as a receptacle 34 or 308 that serves as a screw boss for an end retention device, such as retaining screw 310 and bushing 314.

FIGS. 24-31 show various aspects of the installation of a rolling shutter system at the opening of a host structure. In one embodiment, the rolling shutter system includes a frame comprising one or more guide tracks positioned at the periphery of the opening in the host structure. The rolling shutter is commonly secured to the top of the opening and the guide tracks are positioned at either side of the opening. As the rolling shutter is lowered to cover the opening, the guide tracks retain and guide the ends of the slats as they are extended toward the bottom of the opening and into the closed position.

Figure 24:
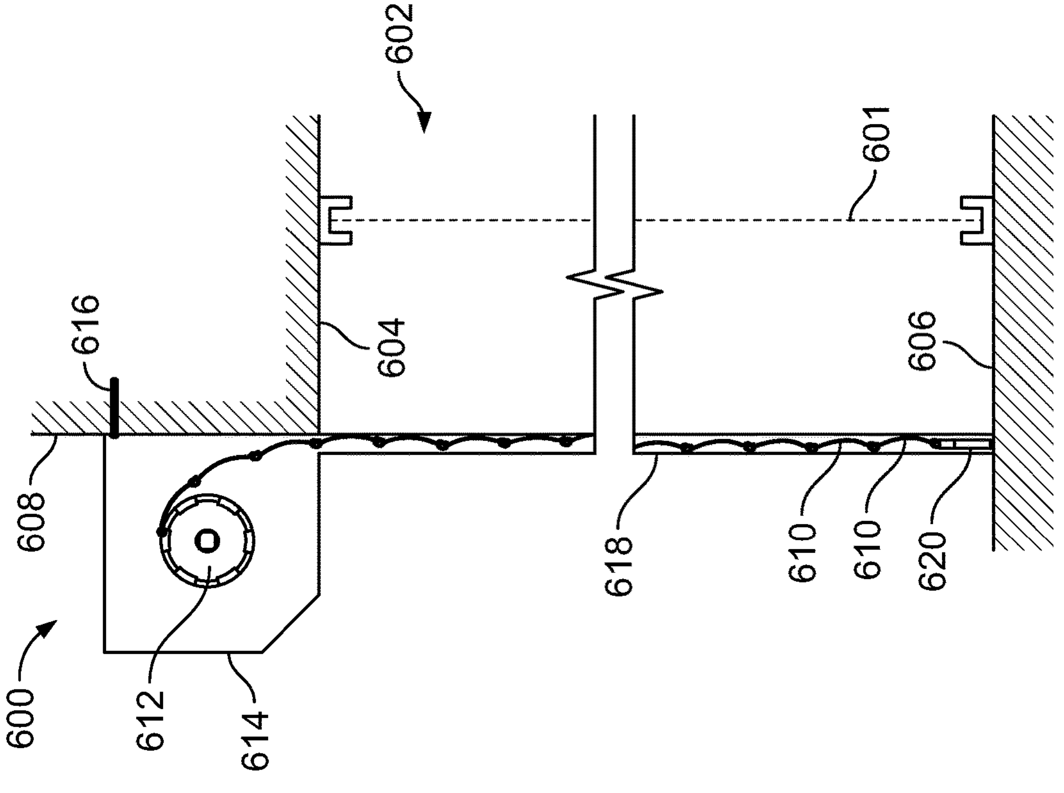
FIG. 24 is a side section view of an embodiment of a rolling shutter mounted at the opening of a structure.

FIG. 24 shows an embodiment of a rolling shutter system 600 installed by a wall mount at the opening 602 of a host structure, such as for a window 601. Opening 602 has a top 604, a bottom 606, and a wall 608. Rolling shutter system 600 comprises multiple linked slats 610 that form the rolling shutter. Slats 610 are coupled to a spindle 612 and covered by a housing 614 that is sized and shaped to receive and store the rolling shutter in a retracted (wound) position. Housing 614 may be secured to wall 608 at the top of opening 602, using one or fasteners 616 such as screws, bolts, nails, or other fasteners known in the art. In a preferred embodiment, fastener 616 is a concrete or masonry anchor, such as a Tapcon®. The ends of slats 610 are captured in one or more guide tracks 618, that align and secure the slats in position to cover the opening. The rolling shutter may include a base slat 620, which may also have ends that are received in guide tracks 618.

Figure 25:
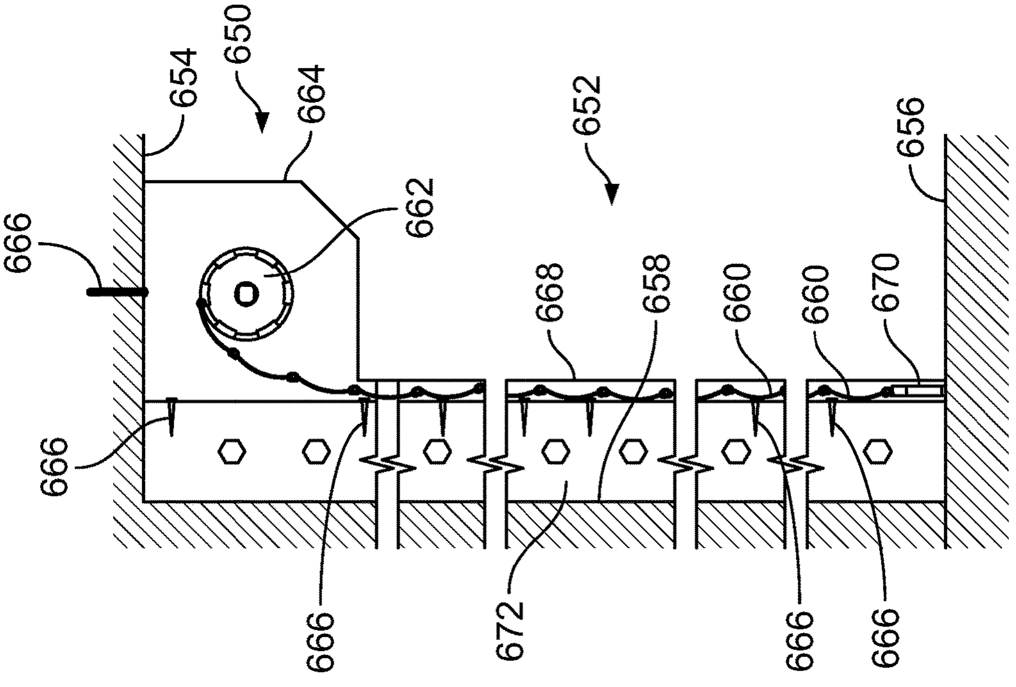
FIG. 25 is a side section view of an alternative embodiment of a rolling shutter mounted at the opening of a structure.

FIG. 25 shows an alternate embodiment of a rolling shutter system 650 installed by a trap mount. The opening of a host structure 652 has a top 654, a bottom 656, and a side wall 658. Rolling shutter system 650 comprises multiple linked slats 660 that form the rolling shutter. The slats are coupled to a spindle 662 and covered by a housing 664 that is sized and shaped to receive and store the rolling shutter in a retracted (wound) position. Housing 664 may be secured to top 654 of opening 652, using one or fasteners 666. The ends of slats 660 are captured in guide tracks 668, that align and secure the slats in position to cover the opening. Guide tracks 668 are secured to side wall 658 by a trap mount. A post 672 is secured to side wall 658, and guide tracks 668 (and housing 664) are secured to post 672 using one or more fasteners, such as fasteners 666. The rolling shutter may include a base slat 670, which may also have ends that are received in guide tracks 668.

Figure 26:
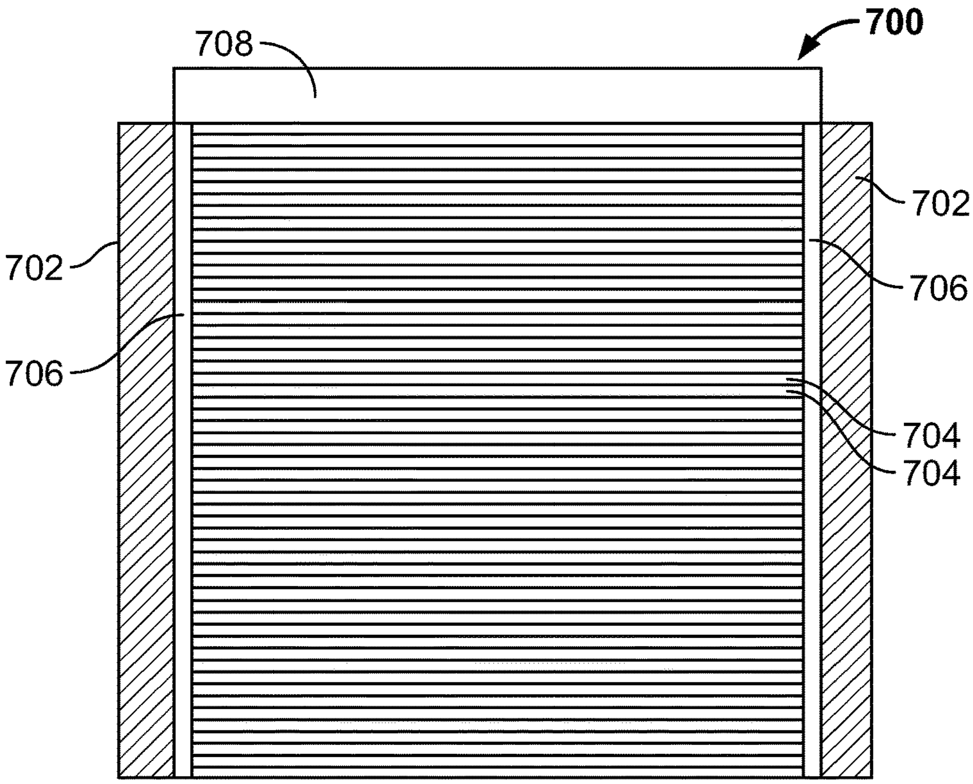
FIG. 26 is a front view of an embodiment of a rolling shutter installed at the opening of a structure.

FIG. 26 shows an embodiment of a rolling shutter system 700, comprising a single rolling shutter installed over the opening of a host structure having side walls 702. A rolling shutter curtain comprises multiple slats 704 that span the width of the opening between side walls 702. The ends of slats 704 are received in guide tracks 706 that are positioned at the sides of the opening and secured to side walls 702. In a retracted position, slats 704 are stored in a housing 708 positioned at the top of the opening.

Figure 27:
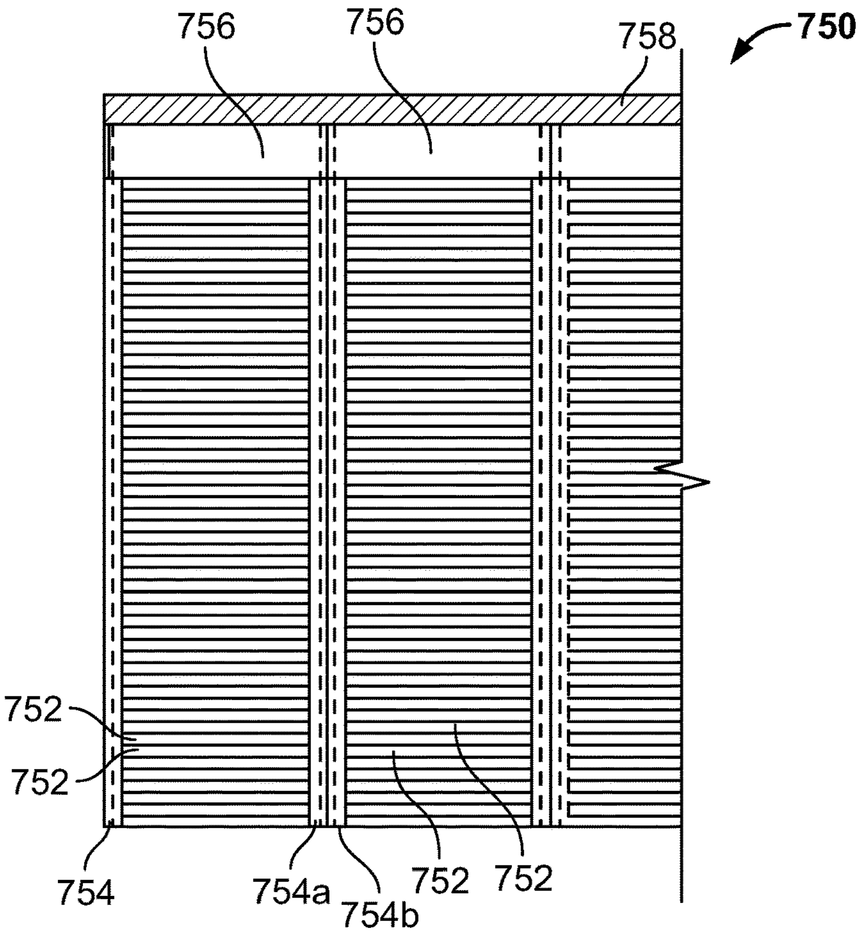
FIG. 27 is a front view of an embodiment of multiple rolling shutters installed at the opening of a structure.

FIG. 27 shows an alternative embodiment of a rolling shutter system 750, where multiple rolling shutter curtains are positioned side-by-side to span the width of an opening in a host structure. Each rolling shutter curtain comprises multiple slats 752, guide tracks 754 and a housing 756. Adjacent rolling shutter curtains have housings 756 positioned side-by-side and secured to the top 758 of the opening. Between adjacent rolling shutters, two guide tracks 754*a* and 754*b* are positioned back-to-back to receive the ends of slats 752 of their respective rolling shutter curtains. In one embodiment, guide tracks 754*a* and 754*b* are secured to a vertical support internal to the opening (not shown), such as an internal mullion.

Figure 28:
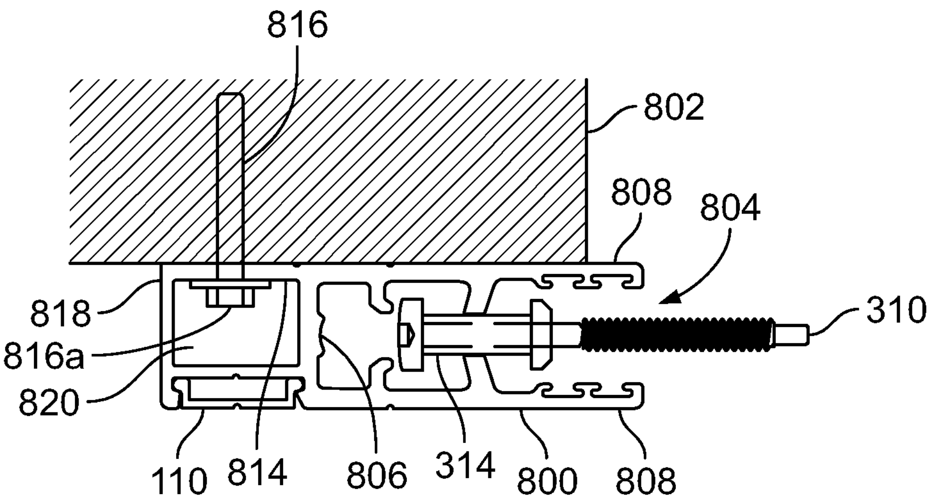
FIG. 28 is a top section view of the guide track and end retention device of FIG. 23B, installed on a building structure by a wall mount.

Referring to FIGS. 28-31, embodiments for securing a guide track 800 at the opening of a host structure, such as to a side wall 802. In the embodiment of FIG. 28, guide track 800 is mounted to wall 802 by a wall mount. Guide track 800 comprises a U-shaped channel 804 formed by a base 806 and walls 808. An end retention device (retaining screw 310 and bushing 314) is received in channel 802 to couple the end of a slat (not shown) to guide track 800. A flange 814 extends from base 804 for receiving a fastener 816 to secure guide track 800 to wall 802. For example, fastener 816 may be an anchor that extends through flange 814 and into wall 802.

Figure 12:
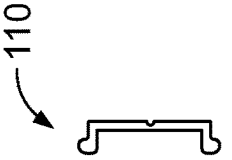
FIG. 12 is a side section view of an embodiment of a cover for a guide track of a rolling shutter system.

In one embodiment, flange 814 forms a channel that is sized and shaped to enclose the head 816*a* of fastener 816. As shown in FIG. 28, an arm 818 extends from flange 814, opposite from guide track base 804. Flange 814, arm 818, and guide track base 804 form a U-shaped channel 820 that receives fastener head 816*a*. A cover may be positioned at the opening of channel 820 to conceal fastener head 816*a*, such as snap fit cover 110 (FIG. 12).

Figure 29:
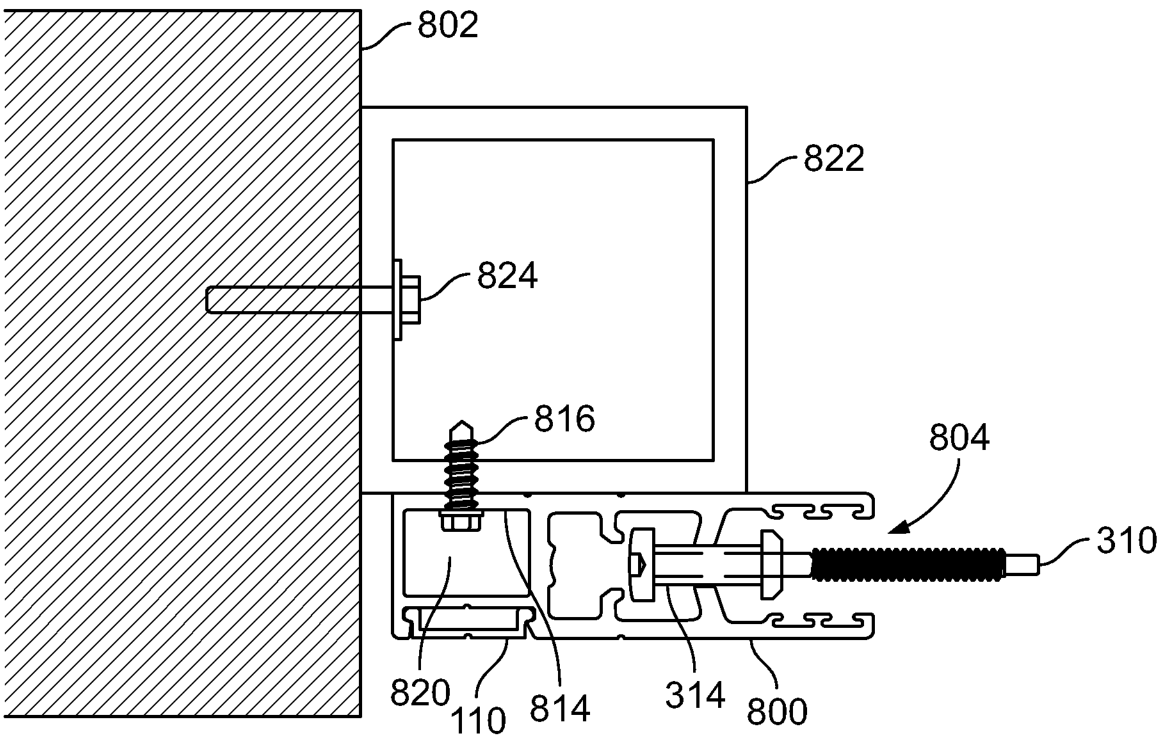
FIG. 29 is a top section view of the guide track and end retention device of FIG. 23B, installed on a building structure by a trap mount.

In the embodiment of FIG. 29, guide track 800 is secured to wall 802 by a trap mount. An intermediate member 822 is fastened to opening wall face 802 by a fastener 824, such as an anchor. Member 822 may be a vertical post, such as a square or rectangular tube. Guide track 800 is secured to member 822 transverse or at right angles to wall face 802, to receive the rolling shutter slats (not shown) that extend across the opening. In one embodiment, guide track 800 is secured to member 822 by a fastener 816 that extends through flange 814 and into member 822, such as a metal screw.

Figure 30:
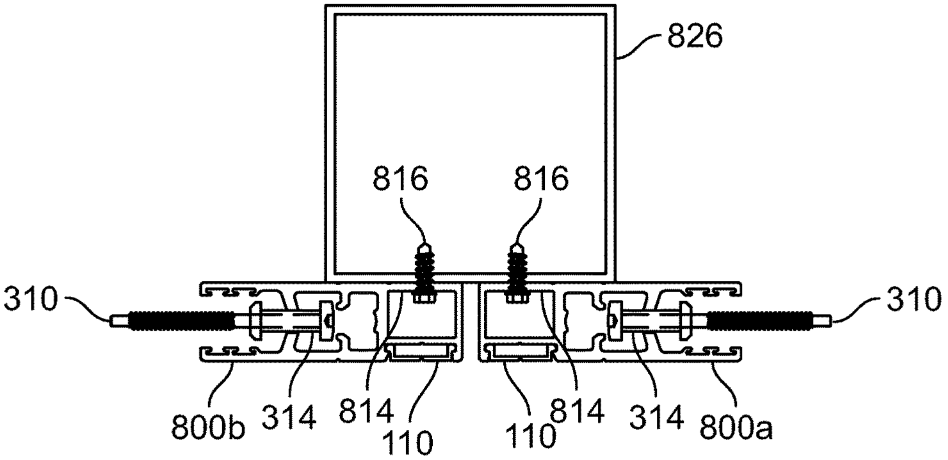
FIG. 30 is a top section view of two guide tracks and end retention devices of FIG. 23B, installed on a mullion by a face mount.

In the embodiment of FIG. 30, two guide tracks 800*a* and 800*b* are secured to an internal mullion 826 by a face mount. Guide tracks 800*a* and 800*b* are positioned adjacent to each other in a back-to-back orientation on the same face of mullion 826. Each guide track 800*a* and 800*b* is secured to mullion 826 in a similar manner as the wall mount shown in FIG. 28. A fastener 816 (e.g., metal screw) extends through flange 814 and into mullion 826.

Figure 31:
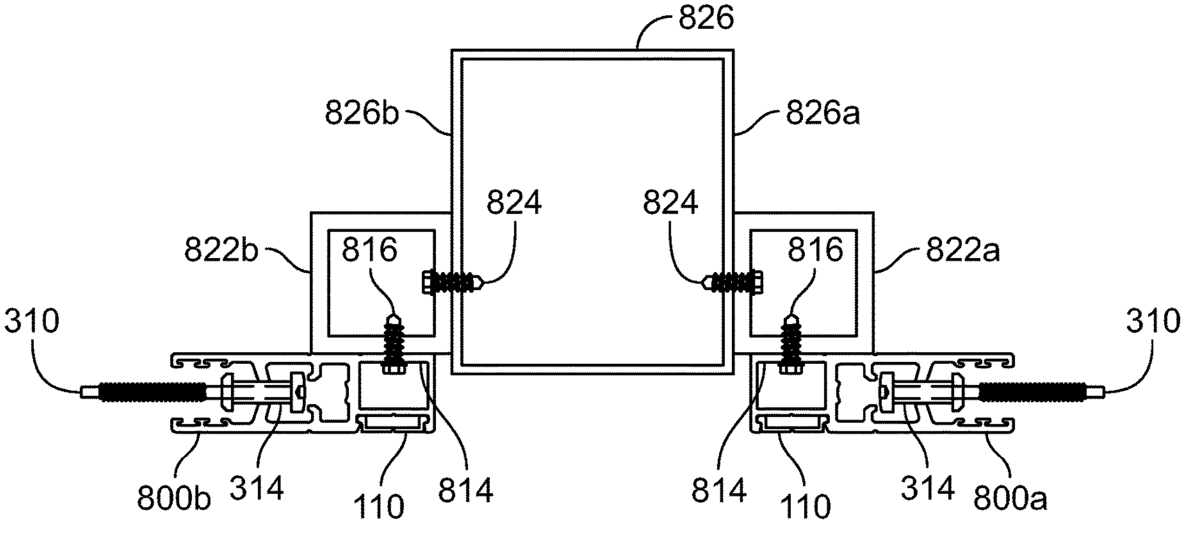
FIG. 31 is a top section view of two guide tracks and end retention devices of FIG. 23B, installed on a mullion by a trap mount.

In the embodiment of FIG. 31, two guide tracks 800*a* and 800*b* are secured to an internal mullion 826 by a trap mount. Guide tracks 800*a* and 800*b* are respectively secured to different faces of mullion 826 through separate intermediate members 822*a* and 822*b*, in a similar manner as the trap mount shown in FIG. 29. In one embodiment, members 822*a* and 822*b* are respectively secured to opposite faces 826*a* and 826*b* of mullion 826 by fasteners 824 (e.g., metal screws). Guide tracks 800*a* and 800*b* are respectively secured to members 822*a* and 822*b* transverse or at right angles to mullion faces 802 by fasteners 816 (e.g., metal screws). The installed guide tracks 800*a* and 800*b* are oriented back-to-back and extend parallel to each other to receive the rolling shutter slats (not shown) that extend across the opening.

Figure 32:
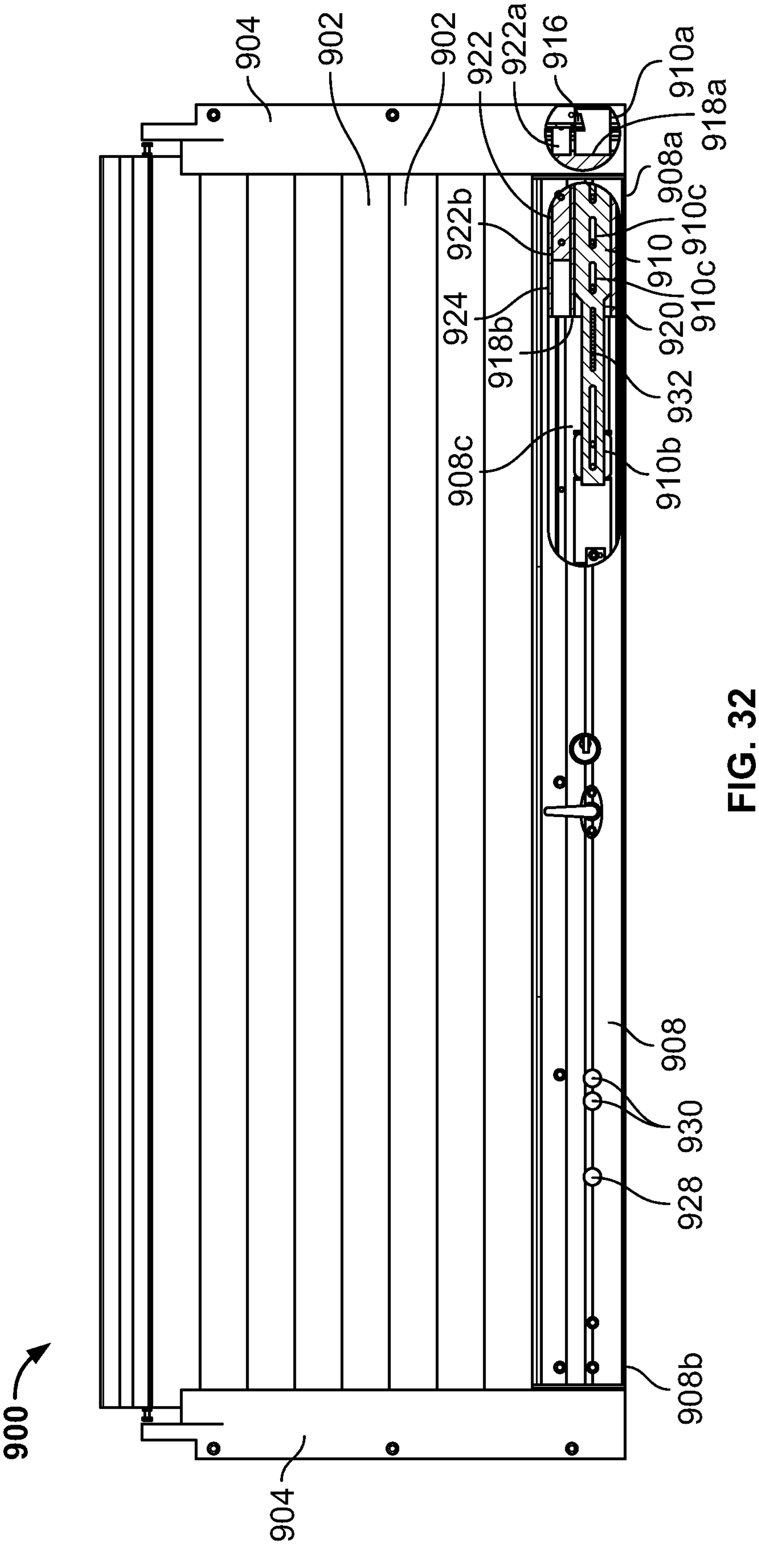
FIG. 32 is a front elevation, cutaway view of a rolling shutter system including an embodiment of a base slat locking system.
Figure 33:
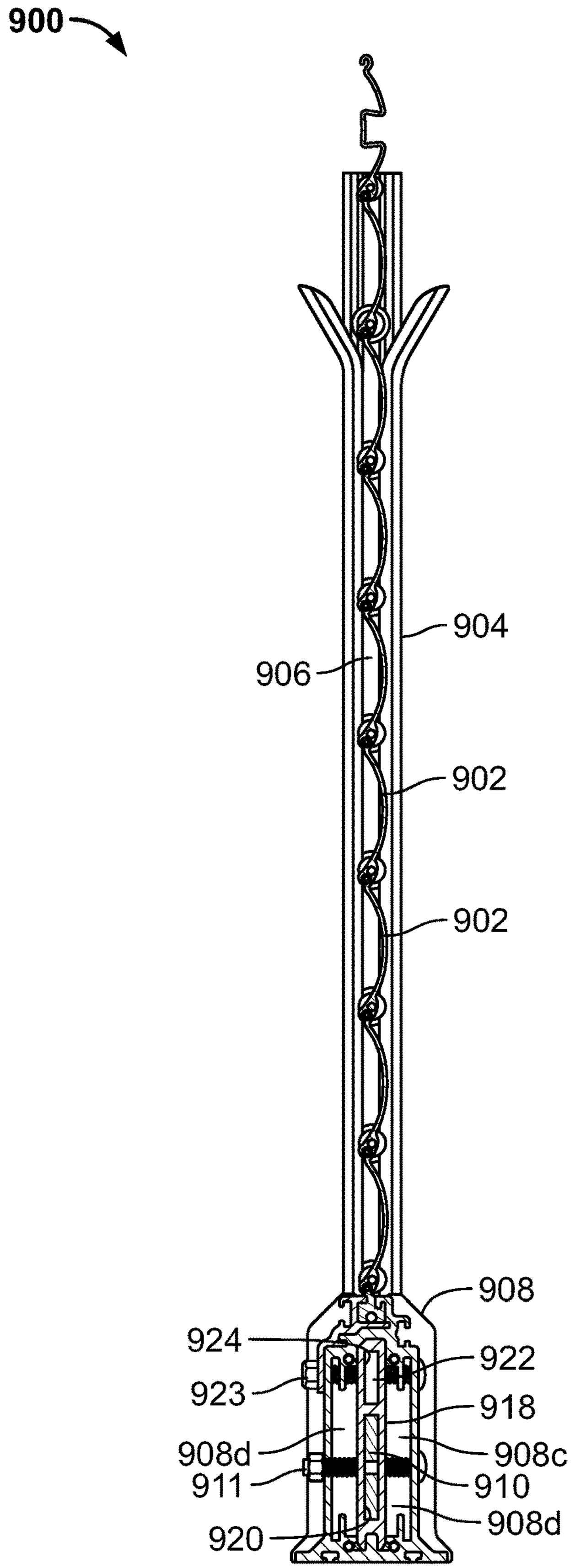
FIG. 33 is a side section view of the rolling shutter system of FIG. 1.
Figure 34A:
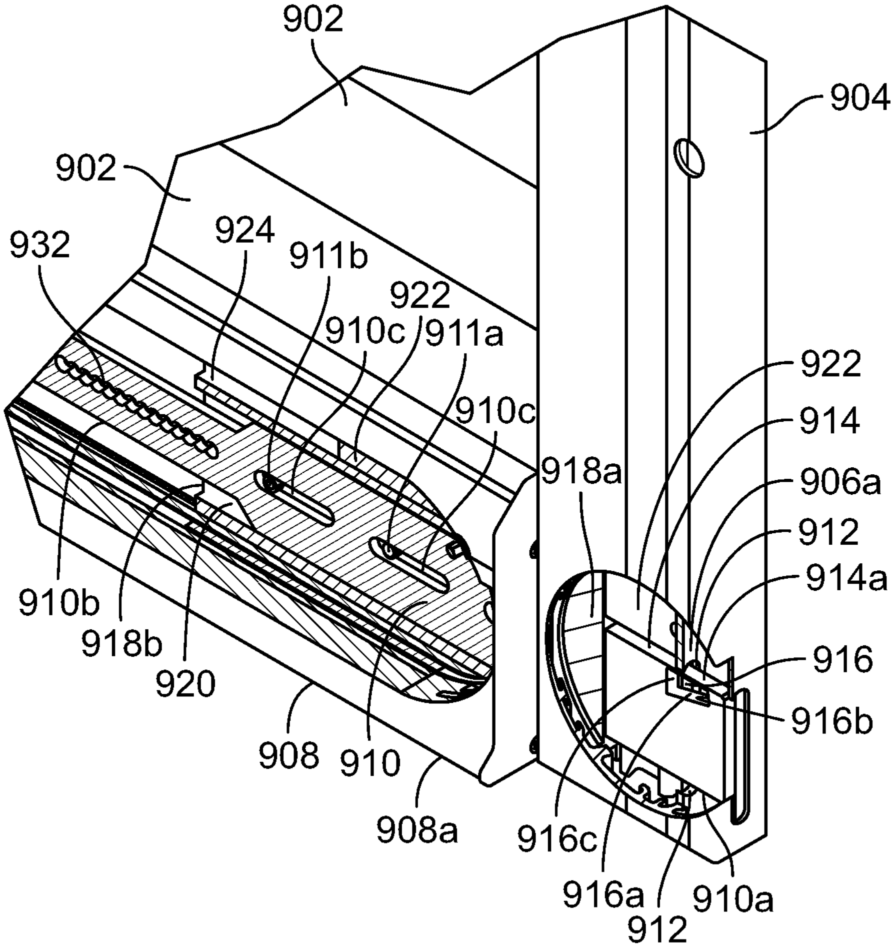
FIG. 34A is an orthogonal cutaway, detail view of the rolling shutter system of FIG. 1.
Figure 34B:
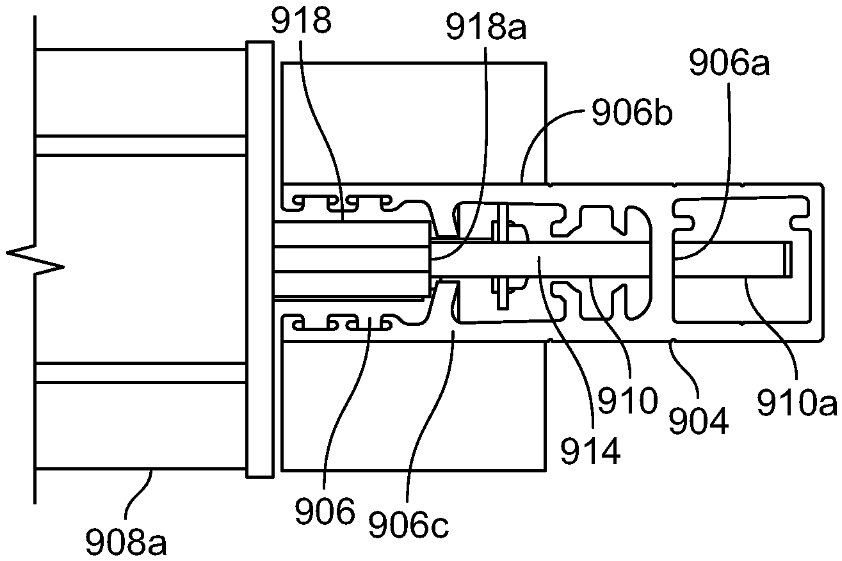
FIG. 34B is a top section, detail view of the rolling shutter system of FIG. 1.

Referring to FIGS. 32-34, a rolling shutter system 900 is shown that includes an alternative embodiment of a base slat with a locking system. Rolling shutter system 900 comprises a series of linked slats 902 and guide tracks 904. Guide track 904 has a U-shaped guide channel 906 formed by a channel base 906*a*, and channel walls 906*b* and 906*c*. Guide channel 906 is sized and shaped to receive the ends of slats 902, which slide longitudinally in the guide channel, as previously described. A base slat 908 is coupled to and positioned at the end of the series of slats 902. The ends 908*a* of base slat 908 are positioned at guide tracks 904. In one embodiment, base slat ends 908*a* are positioned adjacent to, but not within guide track channel 906, as best shown in FIGS. 34A and 34B.

Base slat 908 includes a locking system, comprising a lock bar 910 positioned within the base slat to couple the lock bar to linked slats 902. Lock bar 910 is slidable longitudinally in base slat 908, transversely within guide channel 906 and channel base 906*a*, between locked and unlocked positions. In the locked position, lock bar 910 extends transverse to channel base 906*a*. In one embodiment, lock bar 910 has opposite ends 910*a* and 910*b*, where lock bar end 910*a* is positioned proximal guide channel 906 and extends transverse to channel base 906*a* in the locked position. As shown in FIG. 34A, a slot 912 may be formed in channel base 906*a*, that is sized and shaped to receive lock bar end 910*a*, and allow the lock bar end to pass through and extend transverse to the channel base in the locked position. In a preferred embodiment, slot 912 is positioned to correspond to the position of lock bar 910 when the rolling shutter is extended to the closed position. Attempts to raise base slat 908 and move the rolling shutter to an open position will cause lock bar 910 (lock bar end 910*a*) to contact channel base 906*a*, which prevents the upward movement of the base slat and rolling shutter.

Attempts to forcibly raise the rolling shutter from a closed position by prying base slat 908 upward, may cause the base slat to be deflected or bent into an inverted V-shape. As base slat 908 is bent, lock bar 910 may be pulled from transverse engagement with channel base 906*a* and withdrawn from guide track 904, which allows the base slat and the rolling shutter to be raised. In one embodiment, lock bar 910 includes an anti-pry feature. Lock bar 910 has an edge 914 that includes a segment comprising a breakaway wall 914*a* extending over a cut out or notch 916 in the lock bar edge. Notch 916 has a notch base 916*a*, and opposite first and second notch sides 916*b* and 916*c*, the first notch side 916*b* proximal to lock bar end 910*a*. Notch base 916*a*, and first and second notch sides 916*b*, 916*c* define the notch space 916, which is enclosed by breakaway wall 914*a*. Breakaway wall 914*a* and notch 916 are positioned at lock bar end 910*a*, and are aligned with channel base 906*a* when lock bar 910 is in the locked position.

When base slat 908 is forced upward, breakaway wall 914*a* contacts channel base 906*a*. As additional force is applied, breakaway wall 910*b* fails and breaks apart to allow channel base 906*a* to move into notch 916. If sufficient force is applied to bend base slat 908, channel base 906*a* is captured within notch 916, which prevents lock bar 910 from being pulled from transverse engagement with channel base 906*a* and withdrawn from guide track 904. As a result, lock bar 910 becomes a tension member that resists deflection of base slat 908 and the upward movement of the rolling shutter. Notch 916 may be configured to prevent inadvertent disengagement and increase retention of channel base 906*a* in the notch. In one embodiment, first notch side 916*b* and lock bar edge 914 form an acute interior angle (with first notch side 916*b* and breakaway wall 914*a* forming the complementary obtuse interior angle). In a further embodiment, notch base 916*a* and first notch side 916*b* may form an interior right angle.

Attempts to force the rolling shutter may also include twisting the base slat 908 to dislodge the lock bar 910 from engagement with guide track 904. In one embodiment, the locking system further comprises an anti-twist bolster or sleeve 918 positioned in base slat 908. As best shown in FIGS. 32 and 33, base slat 908 comprises a longitudinal channel 908*c* with a channel opening at end 908*a*. Sleeve 918 is slidingly received in base slat channel 908*c*, and may be extended from (or retracted into) the channel opening transversely to guide channel 906. In one embodiment, base slat channel 908*c* has a width that is greater than the width of sleeve 918, such that one or more longitudinal pockets 908*d* are be formed within the channel adjacent to sleeve 918 (e.g., on one or both sides of sleeve 918). Base slat pockets 908*d* may be used to provide additional functionality to base slat 908. For example, reinforcing bars (e.g., hardened steel bars or plates) may be positioned in pockets 908*d* to strengthen base slat 908.

Sleeve 918 has opposite first and second ends 918*a* and 918*b*, where first end 918*a* is positioned proximal to base slat end 908*a*, and second end 918*b* is positioned distal to base slat end 908*a*. Sleeve first end 918*a* has a sleeve opening 920 that is sized and shaped to slidably receive lock bar 910, with lock bar end 910*a* positioned proximal to the sleeve first end 918*a*, and lock bar end 910*b* positioned in sleeve 918 distal to the sleeve first end.

In operation, lock bar 910 is retracted into sleeve 918, and sleeve 918 is retracted into base slat 908, to allow base slat end 908*a* to be positioned at guide track 904. Sleeve end 918*a* is then slidingly extended transversely and positioned in guide channel 906. In the locked position, lock bar end 910*a* is slidingly extended from sleeve opening 920 and base slat 908, into guide channel 906 and transverse to channel base 906*a*. Sleeve 918 acts as a sheath for lock bar 910, that increases the torsional strength of the lock bar. Positioning sleeve 918 in guide channel 906 further increases the resistance to twisting within guide track 904.

In one embodiment, lock bar 910 includes one or more longitudinal slots 910*c*. A pin 911*a* extends transversely through base slat 908, sleeve 918, and through slot 910*c*. In a preferred embodiment, pin 911*a* is a removable fastener, such as a screw or bolt. The movement of pin 911*a* in longitudinal slot 910*c* guides the longitudinal movement of lock bar 910 in base slat 908 and sleeve 918, and also limits the maximum retraction or extension of the lock bar in the base slat and sleeve.

In one embodiment, the locking system further comprises a stop bar 922 that prevents the base slat and rolling shutter from being raised completely out of guide track 904. Stop bar 922 is positioned in base slat 908 and is slidable longitudinally in the base slat, transversely to guide channel 906. Stop bar has opposite ends 922*a* and 922*b*, where stop bar end 922*a* is positioned to be slidably extended into guide channel 906.

In a preferred embodiment, sleeve first end 918*a* has a sleeve opening 924 that is sized and shaped to slidably receive stop bar 922, with stop bar end 922*a* positioned proximal to the sleeve first end and stop bar end 922*b* positioned in sleeve 918 distal to the sleeve first end. Stop bar sleeve opening 924 is preferably separate from lock bar sleeve opening 920. In operation, stop bar 922 (and lock bar 910) is retracted into sleeve 918, and sleeve 918 is retracted into base slat 908, to allow base slat end 908*a* to be positioned at guide track 904. Sleeve end 918*a* is then slidingly extended transversely into guide channel 906, and stop bar end 922*a* is further slidingly extended into guide channel 906. Stop bar end 922*a* is preferably positioned adjacent to channel base 906*a*. Unlike lock bar 910, stop bar 922 does not extend transverse to channel base 906*a* and does not operate to lock the position of the rolling shutter. In one embodiment, stop bar 922 is secured in the extended position by a pin 923*a*, that extends transversely through base slat 908, sleeve 918, and stop bar 922. In a preferred embodiment, pin 923*a* is a removable fastener, such as a screw or bolt.

Guide channel 906 includes a guide channel stop (not shown) positioned at or near the top of guide track 904. The guide channel stop is aligned to engage stop bar 922, and preferably stop bar end 922*a*. As the rolling shutter is raised and base slat 908 reaches the top of guide track 904, stop bar end 922*a* contacts the guide channel stop, which prevents further upward movement of the base slat and rolling shutter. In one embodiment, the stop comprises a spring that provides a resilient stop. To allow the base slat and rolling shutter to be completely raised out of guide track 904, stop bar 922 may be slidingly retracted into opening 924 of sleeve 918 and out of alignment to engage the guide channel stop.

Figure 35A:
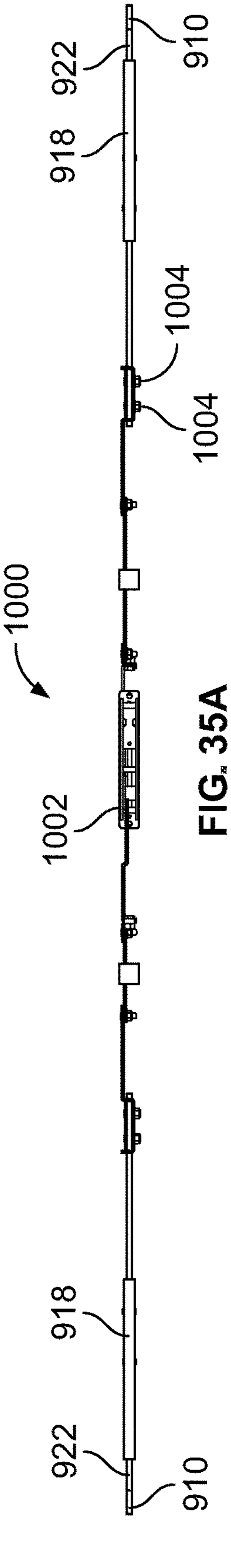
FIG. 35A is a top view of an embodiment of a lock assembly for use in a rolling shutter system.
Figure 35B:
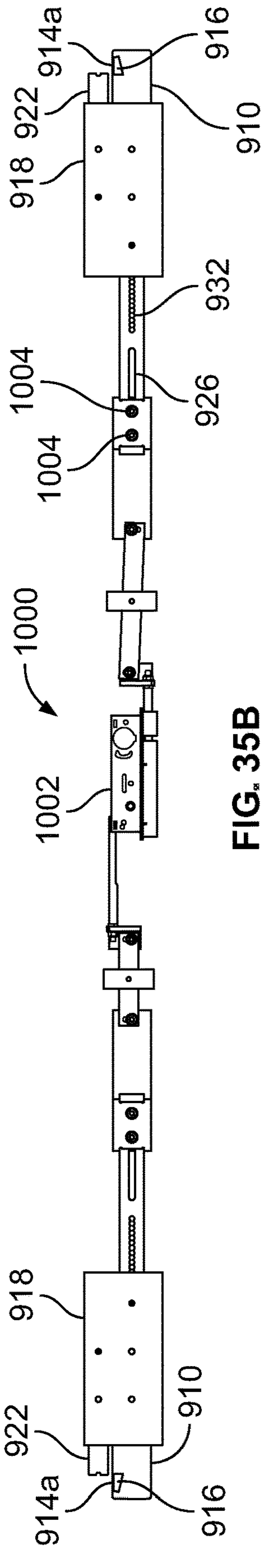
FIG. 35B is a front elevation view of the lock assembly of FIG. 35A.
Figure 35C:
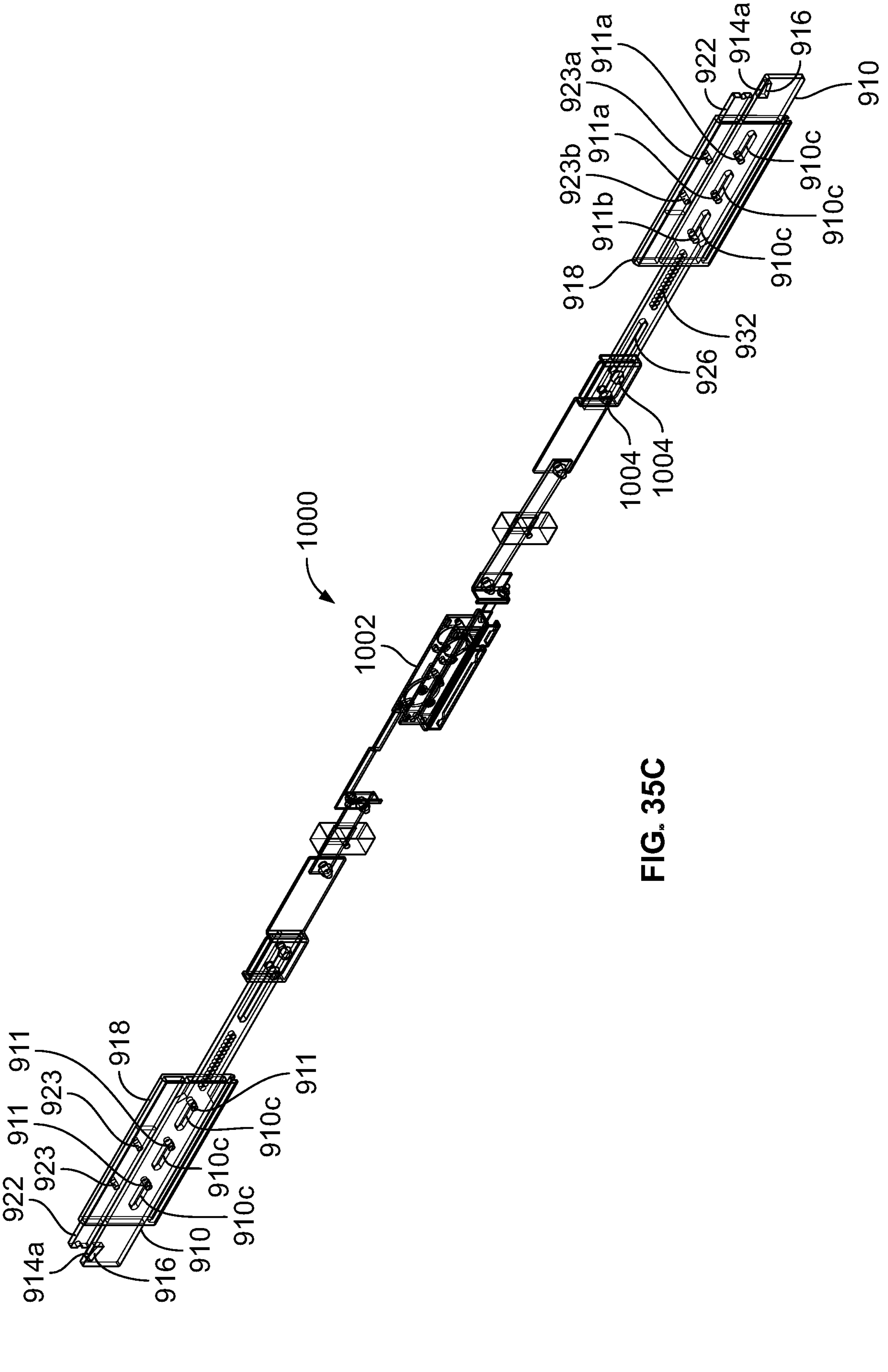
FIG. 35C is an orthogonal view of the lock assembly of FIG. 35A, showing hidden lines.

As shown in FIG. 32, a rolling shutter system typically comprises two guide tracks 904 that are positioned at either side of the rolling shutter. The configurations of the two guide tracks 904 and engagement of the ends of the rolling shutter slats 902 in the guide tracks are mirror images of each other. Similarly, base slat 908 may have opposite ends 908*a* and 908*b* that comprise mirror image locking systems. FIGS. 35A-35C show an embodiment of a lock mechanism 1000 with opposite ends that have mirror image arrangements of lock bar 910, stop bar 922, and sleeve 918. In one embodiment, lock mechanism 1000 comprises a conventional rack and pinion type mechanism 1002 for moving the lock bars 910 between their locked and unlocked positions, as is known in the art.

The locking system preferably allows for adjustment and proper positioning of the lock bar, while the lock mechanism and lock bar are positioned in the base slat and guide track. The locked and unlocked positions of lock bar 910 relative to base slat 908 are typically determined upon installation, and lock mechanism 1000 is adjusted to conveniently switch the lock bar between the predetermined positions. Conventional locking devices must be removed from the base slat for adjustment of the locking elements to their proper locked and unlocked positions. This necessitates a process of trial and error, as the proper positioning of the locking elements can only be confirmed after reinstallation in the base slat and guide track. To facilitate installation of the locking device, the base slat is commonly configured to be open at the bottom with a removable cover plate. This open structure reduces the strength of the base slat. The ability to adjust lock bar 910 while installed in base slat 908 and guide track 906, facilitates installation and allows for base slat designs that have increased strength.

Lock mechanism 1000 may be actuated to move between extended (locked) and retracted (unlocked) positions, and is coupled to lock bar 910. In one embodiment, lock bar 910 includes a longitudinal slot 926 (e.g., at end 910*b*) and lock mechanism 1000 comprises one or more pins 1004 slidably positioned in slot 926. Once positioned in base slat 908, lock mechanism 1000 is actuated to the fully extended position, and lock bar 910 slides on pins 1004 and is adjusted to the proper locked position transverse to channel base 906*a*. Lock bar 910 is then fixedly secured to lock mechanism 1000, such that actuation of the lock mechanism to the fully extended position automatically moves the lock bar to the proper locked position. In one embodiment, pins 1004 are fasteners that releasably secure lock bar 910 to lock mechanism 1000. For example, pins 1004 may be bolts that can be tightened to fixedly secure lock bar 910 to lock mechanism 1000.

In one embodiment, base slat 908 has one or more ports or openings 928 and 930 (FIG. 32) to allow access to and adjustment of lock mechanism 1000 and lock bar 910 while the lock mechanism is installed in the base slat. Opening 928 is aligned with a segment 932 of lock bar 910, such that the lock bar segment is accessible through opening 928 to adjust the position of the lock bar in base slat 908—e.g., by insertion of a tool to manually engage and slide the lock bar within the base slat. In a preferred embodiment, segment 932 comprises a series of holes that can be alternately engaged by the tool (e.g., screwdriver) to move lock bar 910. Openings 930 are aligned with pins 1004, such that the pins are accessible through openings 930 (e.g., by insertion of a tool) to manually operate the fasteners and fixedly secure or release lock bar 910 and lock mechanism 1000.

In one embodiment, lock bar 910 is coupled to sleeve 918, such that the adjustment of the position of the lock bar also adjusts the position of the sleeve. In a further embodiment, stop bar 922 may be coupled to sleeve 918, such that the adjustment of the position of the lock bar also adjusts the position of the sleeve and stop bar. For example, adjustment to retract lock bar 910 toward base slat 908, also adjusts and retracts sleeve 918 and stop bar 922. In one embodiment, lock bar 910 is coupled to sleeve 918 by a pin 911*b* that extends transversely through the sleeve and through lock bar slot 910*c*. Stop bar 922 may be coupled to sleeve 918 by a pin 923*b*, that extends transversely through sleeve 918, and engages the stop bar. In a preferred embodiment, pins 911*b* and/or 923*b* are removable fasteners, such as a roll pin.

FIGS. 36-39 show an alternative embodiment of a locking system that comprises a base slat 950 and lock bar 952. Base slat 950 has an end 950*a*, and a longitudinal lock bar channel 954 with a channel opening 954*a* at base slat end 950*a*. Lock bar 952 is positioned in lock bar channel 954, and is slidable longitudinally between locked and unlocked positions. Lock bar 952 has opposite first and second ends 952*a* and 952*b*. In the locked position, lock bar second end 952*b* is positioned within lock bar channel 954, and lock bar end 952*a* extends from channel opening 954*a* and base slat end 950*a*. In the unlocked position, lock bar 952 is retracted into base slat 950, with first and second lock bar ends 952*a* and 952*b* positioned in lock bar channel 954.

Figure 36A:
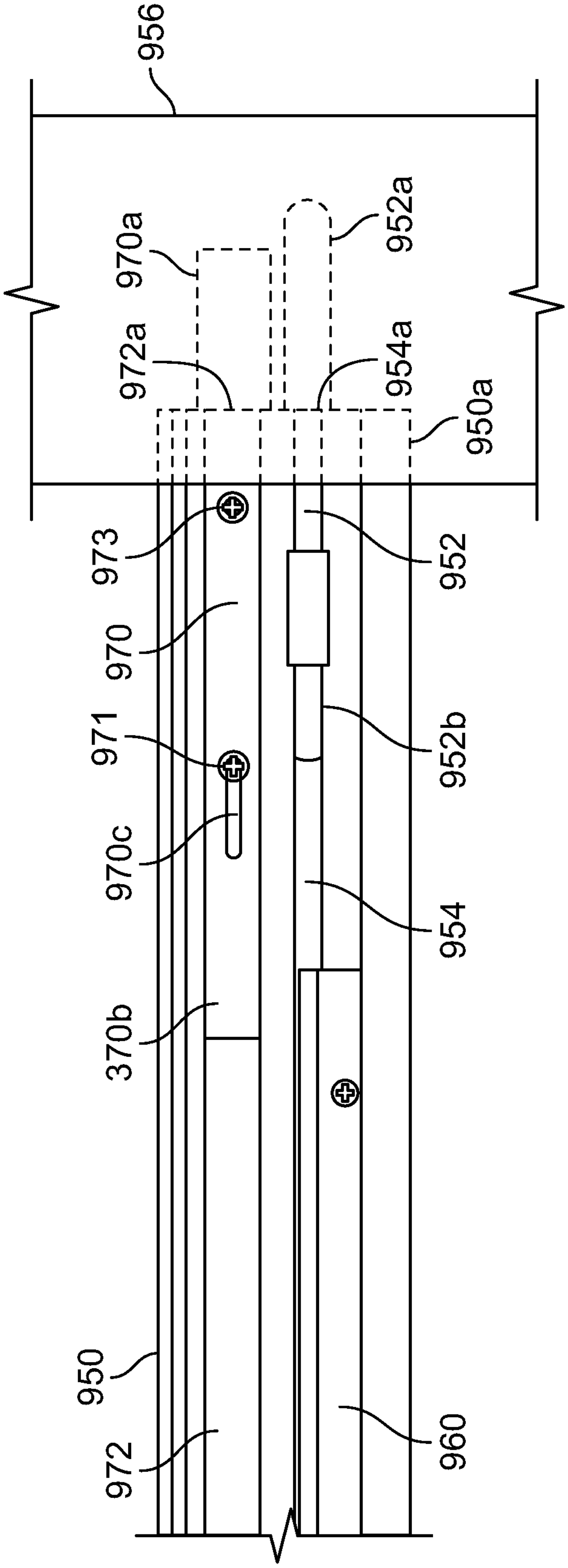
FIG. 36A is a partial front elevation view of a rolling shutter system including an embodiment of a base slat locking system in the locked position.
Figure 36B:
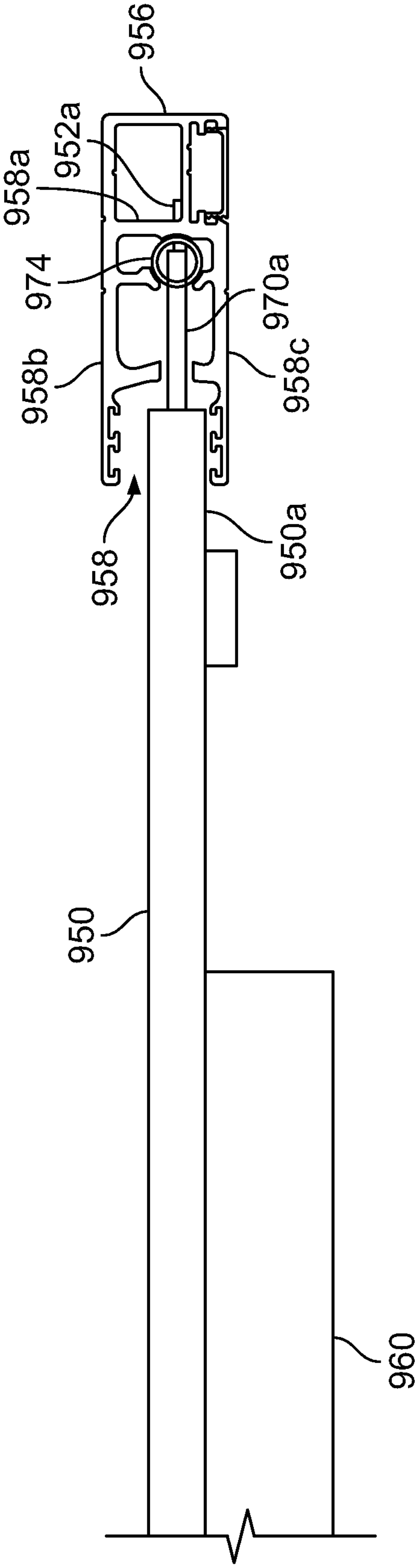
FIG. 36B is a partial top section view of the rolling shutter system of FIG. 36A.
Figure 37A:
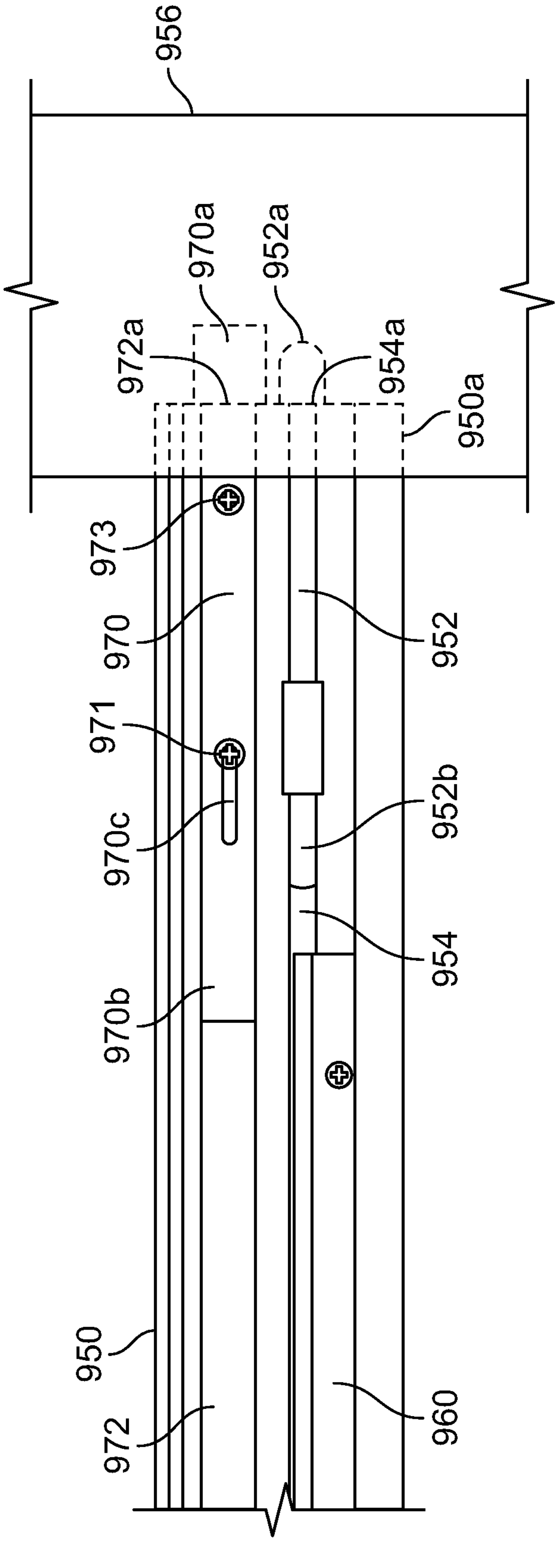
FIG. 37A is a partial front elevation view of the rolling shutter system of FIG. 36A, with the base slat locking system in a partially unlocked position.
Figure 37B:
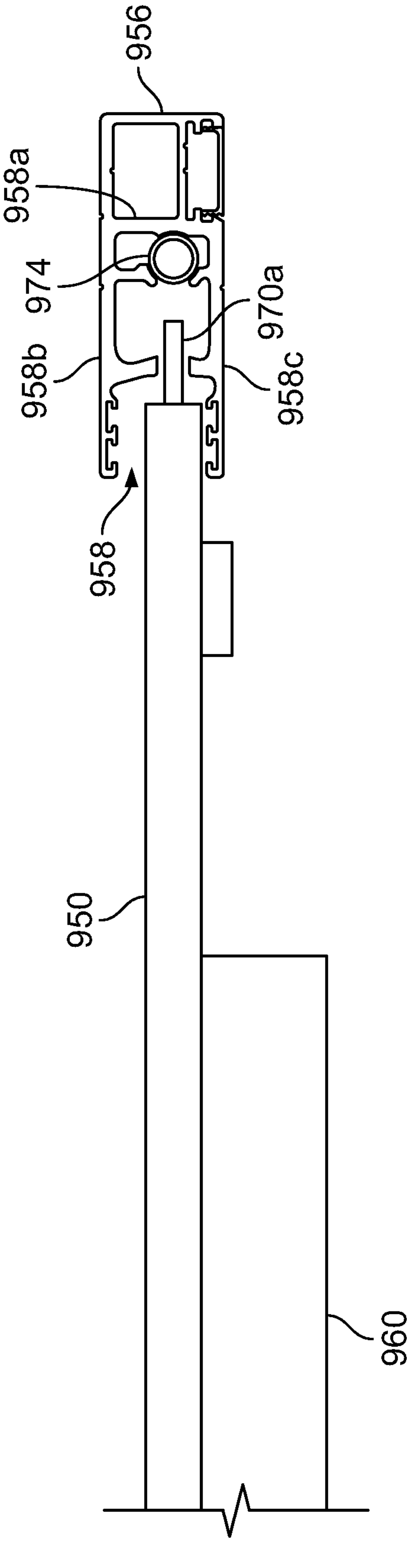
FIG. 37B is a partial top section view of the rolling shutter system of FIG. 37A.
Figure 38:
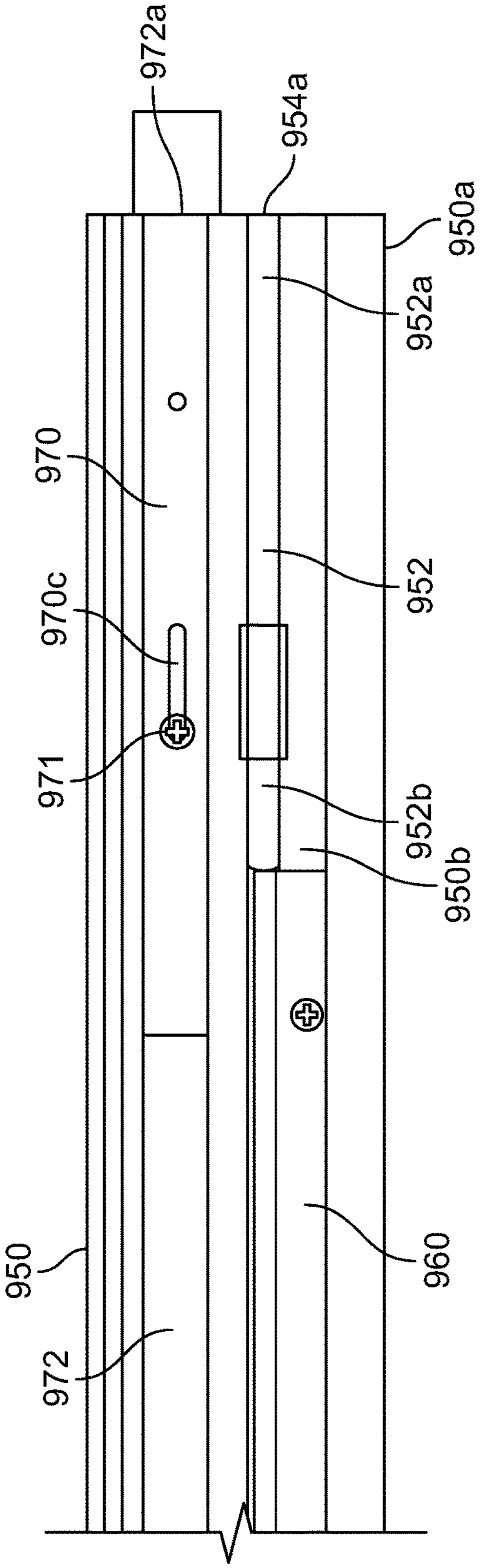
FIG. 38 is a partial front elevation view of the rolling shutter system of FIG. 36A, with the base slat locking system in an unlocked position.

Base slat 950 is positioned in a guide track 956, to increase resistance to torsional forces on the base slat and lock bar 952. Guide track 956 comprises a U-shaped guide channel 958 formed by a channel base 958*a*, and channel walls 958*b* and 958*c*. Base slat end 950*a* is positioned in guide channel 956. FIGS. 36A and 36B show lock bar 952 in the locked position. Lock bar end 952*a* extends from base slat end 950*a*, transverse to guide channel 956 and channel base 958*a*. As base slat 950 is raised, lock bar 952 (lock bar end 952*a*) is aligned to contact channel base 958*a*, which prevents the upward movement of the base slat. FIGS. 37A and 37B show lock bar 952 in a partially unlocked position. Lock bar 952 partially retracted toward base slat 950 and into lock bar channel 954. Lock bar end 952*a* does not extend transverse to channel base 958*a*, and is not aligned to contact the channel base and prevent the upward movement of base slat 950. FIG. 38 shows lock bar 952 in the fully unlocked position, with lock bar 952 and lock bar end completely retracted toward base slat 950 and into lock bar channel 954.

In one embodiment, the locking system further comprises a removable base slat handle 960. In conventional rolling shutter systems, the base slat handle projects transverse to the base slat to facilitate manual raising and lowering of the base slat and rolling shutter. However, the projecting handle can prevent the end of the rolling shutter from being tightly coiled about the spindle. The inability to tightly wind the end of the rolling shutter can interfere with the complete retraction and removal of the rolling shutter from the guide tracks—e.g., to facilitate installation, maintenance, or replacement of the rolling shutter.

Figure 39C:
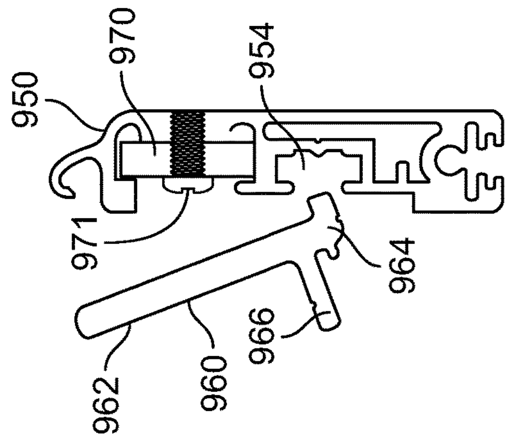
FIG. 39C is a side section view of a base slat locking system of FIG. 39A, showing the base slat handle fully removed.
Figure 39B:
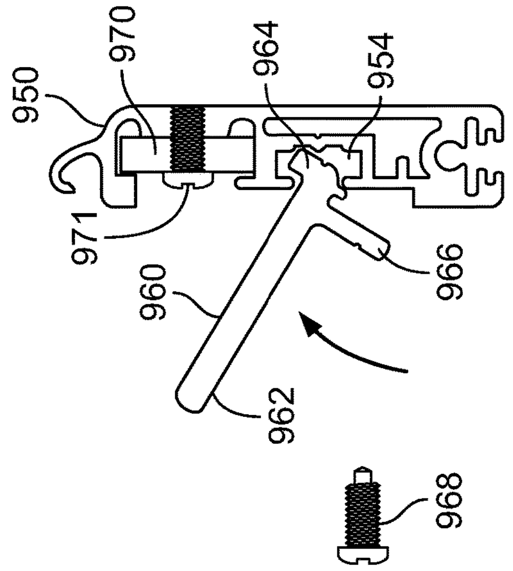
FIG. 39B is a side section view of a base slat locking system of FIG. 39A, showing the removal of the base slat handle.
Figure 39A:
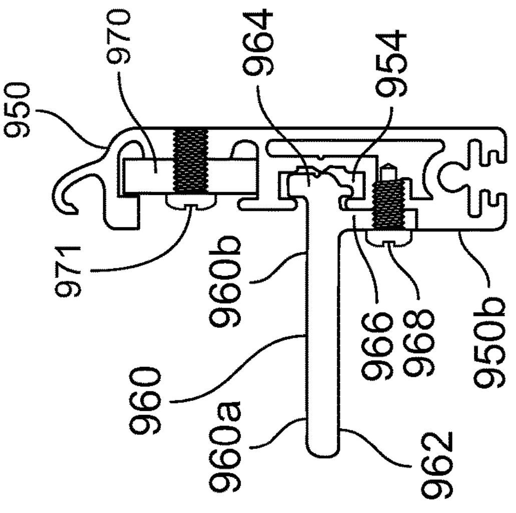
FIG. 39A is a side section view of a base slat locking system with a base slat handle installed.

FIGS. 39A-39B show the operation of removable base slat handle 960. Base slat handle 960 comprises opposite first and second ends 960*a* and 960*b*. First end 960*a* forms a grip 962 that projects transversely to base slat 950 to facilitate the manual raising and lowering of the rolling shutter. Second end 960*b* comprises a stop flange 964 that is sized and shape to be received in lock bar channel 954, and couple base slat handle 960 to base slat 950. In a preferred embodiment, lock bar channel 954 forms a longitudinal slot in base slat 950. Stop flange 964 is configured to be removably received in lock bar channel 954 by transverse insertion through the lock bar channel slot, as best shown in FIG. 39B. In one embodiment, lock bar channel 954 forms a slot with a C-shaped cross section, and stop flange 964 is configured for transverse (rotational) insertion through the lock bar channel slot and into lock bar channel 954. The insertion of stop flange 964 in lock bar channel 954 provides a stop that restricts the sliding movement of lock bar 952 in the lock bar channel, and retraction of the lock bar into base slat 950. In a preferred embodiment, base slat handle 960 is coupled to base slat 950 such that stop flange 964 is positioned to contact lock bar 952 in the fully unlocked position (FIG. 38).

In one embodiment, handle second end 960*b* further comprises a connector flange 966 that is configured to be positioned on base slat 950 when base slat handle 960 is coupled to the base slat. As best shown in FIG. 39A, the slot of lock bar channel 954 opens at a side 950*b* of base slat 950. When base slat handle 960 is coupled to the base slat 950, connector flange 966 is positioned on base slat side 950*b*. Connector flange 966 may be coupled to base slat 950 by a removable fastener 966, such as a screw. In a preferred embodiment, stop flange 964 and connector flange 966 are positioned on opposites sides of base slat handle second end 960*b*.

In one embodiment, the locking system further comprises a stop bar 970 that prevents base slat 950 and the rolling shutter from being raised completely out of guide track 956. Base slat 950 has a longitudinal stop bar channel 972 that has a channel opening 972*a* at base slat end 950*a*. Stop bar channel 972 and channel opening 972*a* are preferably separate from lock bar channel 954 and channel opening 954*a*. Stop bar 970 is positioned in stop bar channel 972 and is slidable longitudinally in base slat 950, transversely to guide channel 956. Stop bar has opposite ends 970*a* and 970*b*, with stop bar end 970*a* positioned proximal to channel opening 972*a* and base slat end 950*a*, and stop bar end 970*b* is positioned distal to base slat end 950*a*.

Stop bar 970 operates similarly to stop bar 922. Stop bar 970 is first retracted into base slat 950 to facilitate positioning of the base sat in guide track 956. Stop bar 970 is then slidingly extended transversely into guide channel 958, and is preferably positioned adjacent to channel base 958*a*. As base slat 950 is raised within guide track 956, stop bar end 970*a* contacts a stop 974 positioned within guide channel 958 that prevents further upward movement of the base slat. In one embodiment, stop 974 comprises a spring that provides a resilient stop.

In one embodiment, stop bar 970 has a longitudinal slot 970*c*, and a pin 971 that extends transversely through base slat 950 and longitudinal slot 970*c*. In a preferred embodiment, pin 971 is a removable fastener, such as a screw or bolt. The movement of pin 971 in longitudinal slot 970*c* guides the longitudinal movement of stop bar 970 in base slat 950, and also limits the maximum retraction or extension of the stop bar in the base slat. Once stop bar 970 is extended and properly positioned in guide channel 958 to contact stop 974, a second pin 973 may be inserted through base slat 950 to engage and fixedly secure the stop bar to the base slat. In one embodiment, pin 973 is a removable fastener, such as a screw.

Base slat 950 is preferably configured as a unitary extruded body to facilitate manufacture. An example of a base slat with unitary extruded configuration is shown in the cross-section profiles of FIGS. 39A-39C. Lock bar channel 954 and stop bar channel 972 are formed integrally in base slat 950, and are configured as longitudinal C-shaped channels to facilitate extrusion. Configuring lock bar 952 and base slat handle 960 to be positioned in the same lock bar channel 954 further reduces the complexity of the base slat profile for extrusion.

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

What is claimed is:

1. A locking system for a rolling shutter comprising a plurality of linked rolling shutter slats, each rolling shutter slat having an end, the locking system comprising:

a guide track comprising a U-shaped guide channel having a channel base, and first and second channel walls, wherein the U-shaped guide channel is sized and shaped to receive the ends of the rolling shutter slats, the rolling shutter slat ends slidable longitudinally within the U-shaped guide channel; and a lock bar coupled to the linked rolling shutter slats and slidable transversely within the U-shaped guide channel between locked and unlocked positions, the lock bar comprising a lock bar edge, and opposite first and second lock bar ends, the first lock bar end positioned proximal to the U-shaped guide channel;

a notch in the lock bar edge, the notch having a notch base, and opposite first and second notch sides, the first notch side proximal the first lock bar end, wherein the notch base, and the first and second notch sides define a notch space; and a breakaway wall in the lock bar edge, the breakaway wall extending over the notch to enclose the notch space;

wherein the lock bar in the locked position extends transverse to the channel base with the breakaway wall and the notch aligned with the channel base, and failure of the breakaway wall from contact with the channel base allows the channel base to move into the notch.

2. The locking system of claim 1, wherein the first notch side and the lock bar edge form an acute interior angle.

3. The locking system of claim 2, wherein the notch base and the first notch side form a right angle.

4. A locking system for a rolling shutter comprising a plurality of rolling shutter slats, the locking system comprising:

a base slat coupled to the plurality of rolling shutter slats, and having one or more slat openings;

a guide track comprising a U-shaped guide channel having a channel base, and first and second channel walls, wherein the U-shaped guide channel is sized and shaped to receive the rolling shutter slats, and the rolling shutter slats are moveable longitudinally within the U-shaped guide channel;

a sleeve positioned in the base slat and slidable transversely within the U-shaped guide channel, the sleeve having first and second sleeve openings;

a lock bar slidable transversely within the U-shaped guide channel between locked and unlocked positions, the lock bar slidably received in the first sleeve opening, wherein the lock bar in the locked position extends transverse to the channel base;

a stop bar slidable transversely within the U-shaped guide channel, the stop bar slidably received in the second sleeve opening;

a lock moveable between extended and retracted positions, the lock bar positioned on and slidingly coupled to the lock; and a fastener releasably securing the lock to the lock bar;

wherein the lock and lock bar are positioned in the base slat, movement of the lock to the extended position slides the lock bar to the locked position, and the lock bar in the locked position and the fastener are accessible through the one or more slat openings to slide the lock bar on the lock to an adjusted position and secure the lock bar to the lock in the adjusted position;

and wherein the lock bar and the stop bar are coupled to the sleeve, and adjustment of the locked position of the lock bar in the base slat also adjusts a position of the sleeve and the stop bar.

5. The locking system of claim 4, wherein the one or more slat openings includes a first opening aligned with a lock bar segment having a plurality of holes, and wherein the locked position of the lock bar is adjustable on the lock bar by alternate engagement of the plurality of holes through the first opening.

6. The locking system of claim 4, wherein the one or more slat openings includes a second opening, and wherein the fastener is accessible through the second opening to secure the lock to the lock bar.

* * * * *